(12) United States Patent
Tawada

(10) Patent No.: US 8,532,308 B2
(45) Date of Patent: Sep. 10, 2013

(54) STANDING WAVE DETECTION APPARATUS AND METHOD OF CONTROLLING THE SAME

(75) Inventor: Noriaki Tawada, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 421 days.

(21) Appl. No.: 12/783,023

(22) Filed: May 19, 2010

(65) Prior Publication Data

US 2010/0303248 A1  Dec. 2, 2010

(30) Foreign Application Priority Data

Jun. 2, 2009 (JP) .................................. 2009-133452

(51) Int. Cl.
*H04R 29/00* (2006.01)

(52) U.S. Cl.
USPC .................... 381/56; 381/57; 381/58; 381/59

(58) Field of Classification Search
USPC .......................................... 381/56–59, 91–92
See application file for complete search history.

(56) References Cited

U.S. PATENT DOCUMENTS

| | | | |
|---|---|---|---|
| 5,627,899 A | 5/1997 | Craven et al. | |
| 6,721,428 B1 * | 4/2004 | Allred et al. | 381/103 |
| 2005/0031135 A1 | 2/2005 | Devantier et al. | |
| 2005/0157891 A1 * | 7/2005 | Johansen | 381/103 |
| 2007/0030979 A1 | 2/2007 | Nackvi et al. | |
| 2010/0201807 A1 * | 8/2010 | McPherson | 348/118 |
| 2010/0272270 A1 * | 10/2010 | Chaikin et al. | 381/59 |

FOREIGN PATENT DOCUMENTS

| | | |
|---|---|---|
| EP | 1523221 A2 | 4/2005 |
| JP | 4-93727 A | 3/1992 |
| JP | 2007-158589 A | 6/2007 |
| WO | 2007/049200 A1 | 5/2007 |
| WO | 2008/147513 A1 | 12/2008 |

OTHER PUBLICATIONS

European Search Report dated Oct. 5, 2010 issued in corresponding EP Application No. 10164363.3.

* cited by examiner

*Primary Examiner* — Disler Paul

(74) *Attorney, Agent, or Firm* — Fitzpatrick, Cella, Harper & Scinto

(57) ABSTRACT

To efficiently detect a standing wave generated in a room, a standing-wave detection apparatus for detecting a standing wave in a predetermined space, comprises: a sound-receiving unit adapted to receive a sound generated from a sound source arranged in the predetermined space; a storage unit adapted to store time series sound pressure level data acquired by the sound-receiving unit during movement along a path in the predetermined space; an adjustment unit adapted to adjust the time series sound pressure level data stored in the storage unit, based on an adjustment curve determined using a lower envelope of the time series sound pressure level data stored in the storage unit; and a detection unit adapted to detect an existence position of a standing wave in the predetermined space based on the adjusted time series sound pressure level data.

9 Claims, 18 Drawing Sheets

F I G. 5
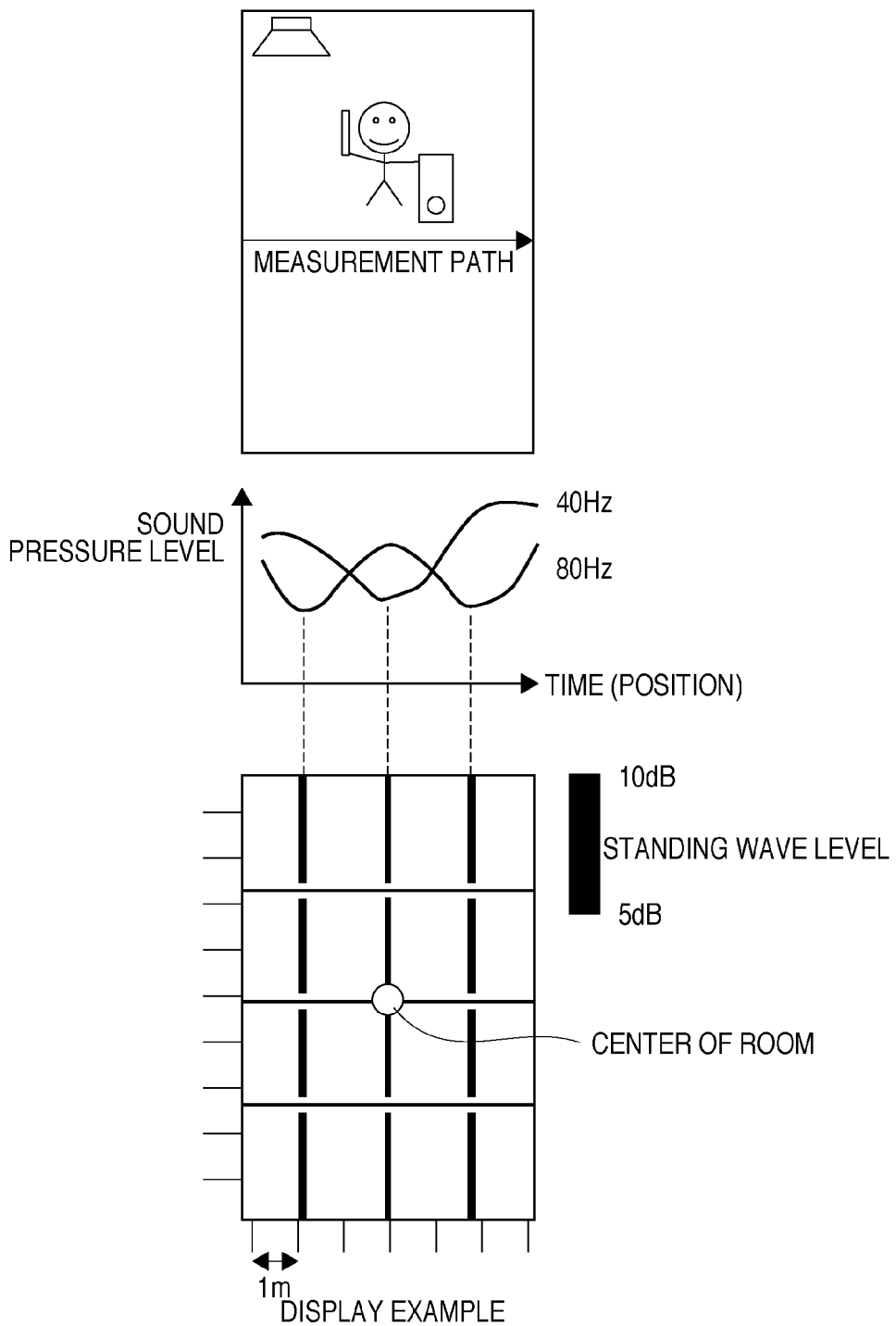

F I G. 7
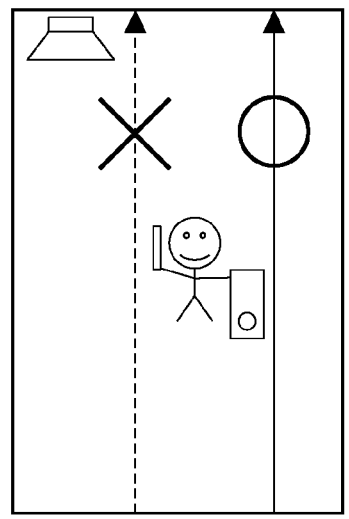
F I G. 8
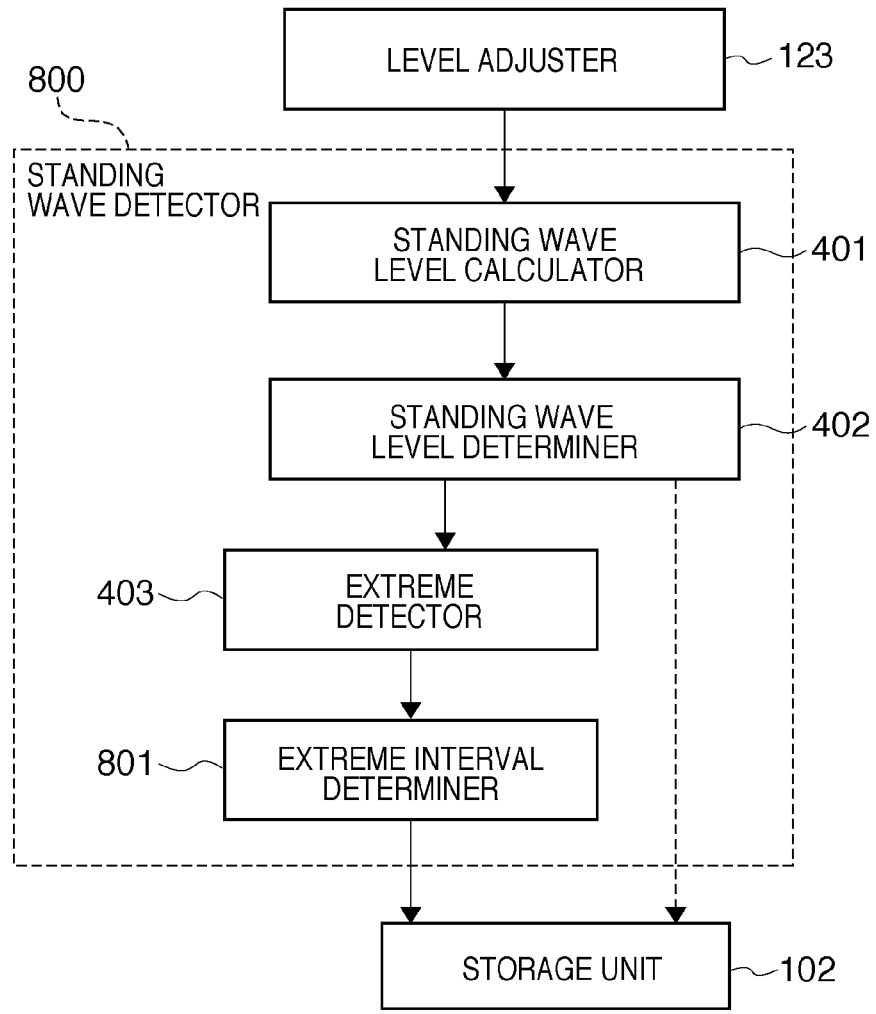

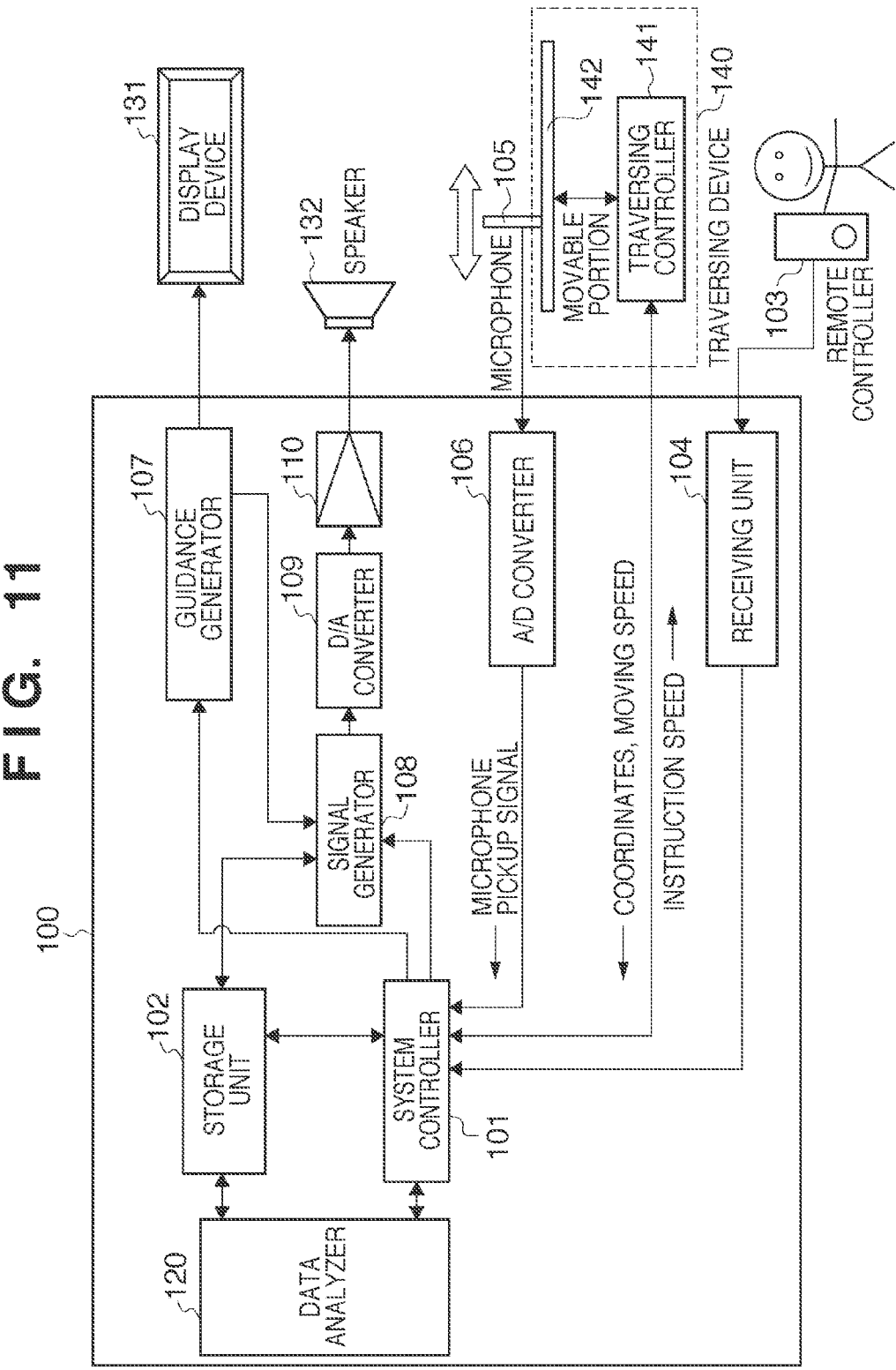

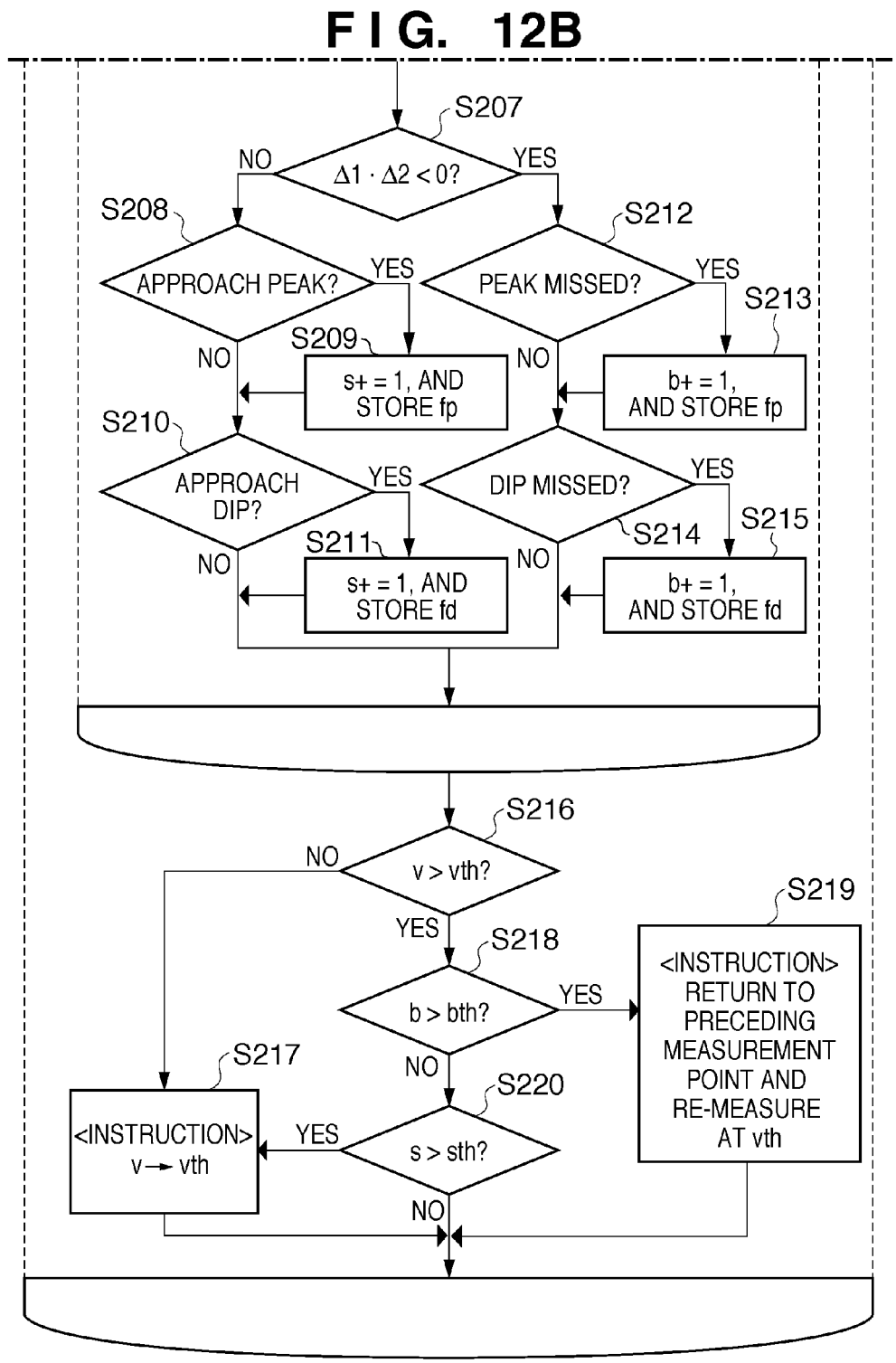
F I G. 12B

F I G. 15

| f | vp | vd |
|---|---|---|
| 20 | 2.00 | 1.00 |
| 30 | 1.33 | 0.67 |
| ⋮ | ⋮ | ⋮ |
| 190 | 0.21 | 0.11 |
| 200 | 0.20 | 0.10 |

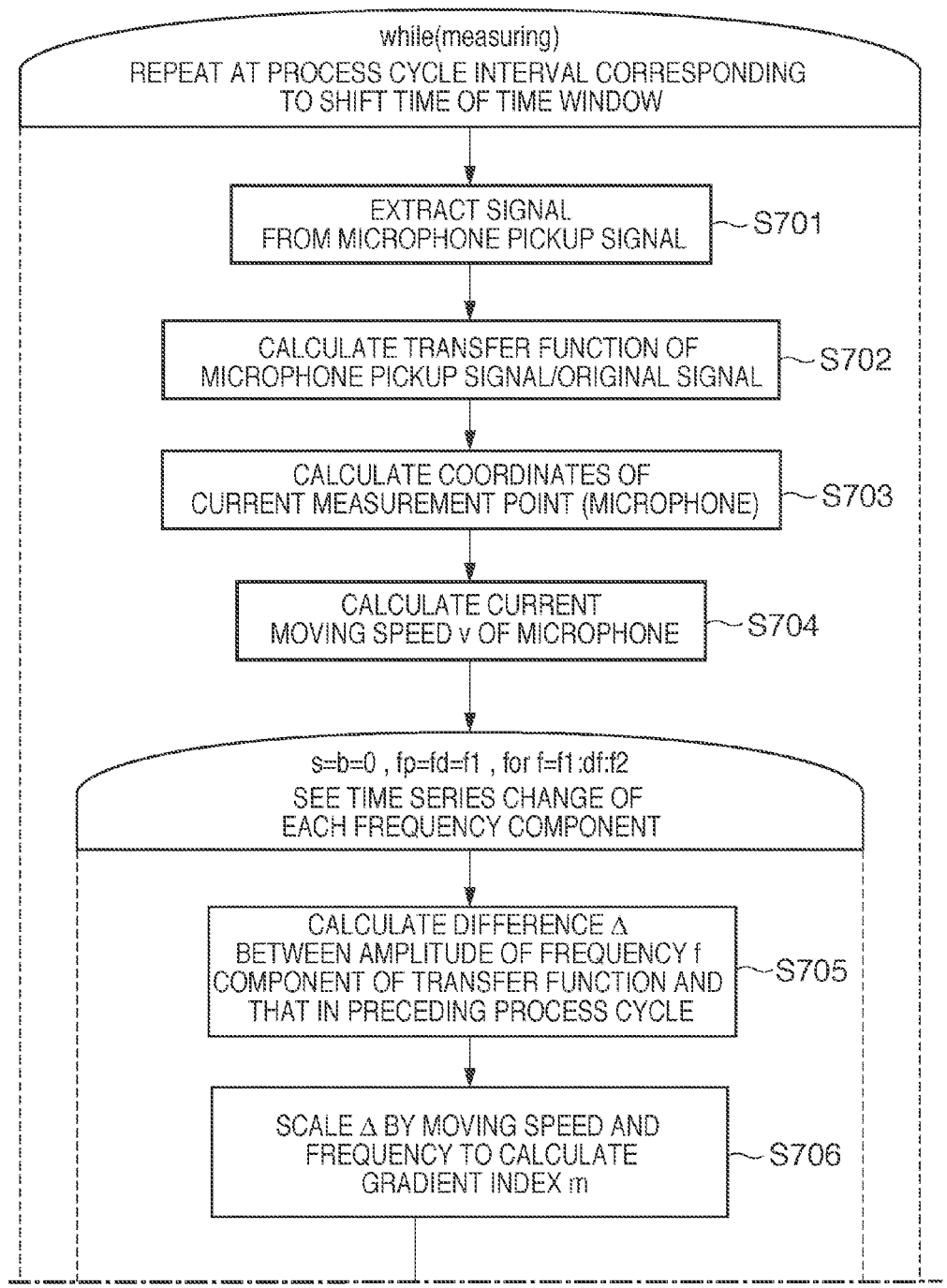
F I G. 17A

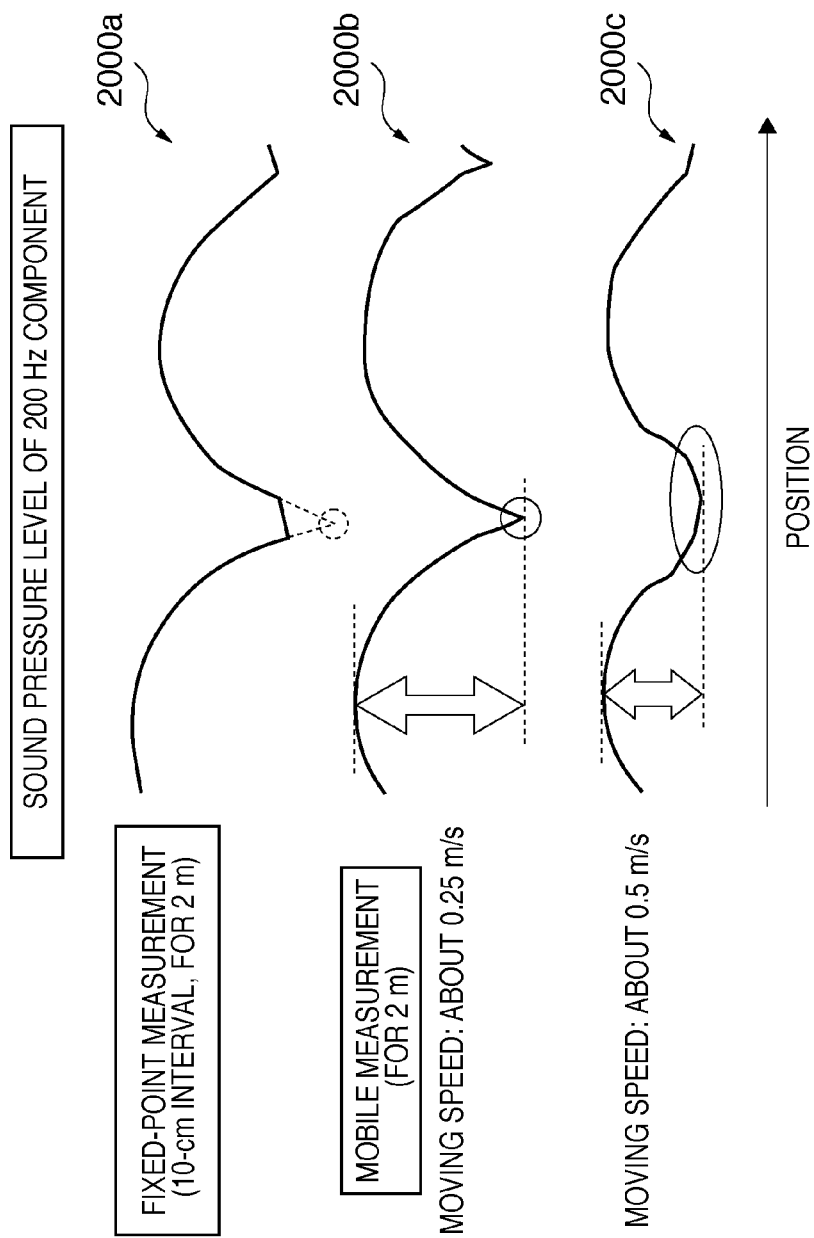

STANDING WAVE DETECTION APPARATUS AND METHOD OF CONTROLLING THE SAME

BACKGROUND OF THE INVENTION

1. Field of the Invention

The present invention relates to a technique of detecting a standing wave in a room.

2. Description of the Related Art

When a sound source such as a speaker generates a sound in a room of, e.g., a home, not only direct sounds that reach various points of the room at minimum distances but also reflected sounds from various planes such as the walls, ceiling, and floor of the room are generated. These sound waves overlap each other. If a composite wave formed by the overlapping waves moves neither forward nor backward, and the maximum amplitude of the composite wave at each point is determined not by time but only by its position in the space, the composite wave is called a standing wave.

Especially, the standing wave is readily generated between planes opposing each other at a frequency at which the distance between the planes is an integer multiple of the half wavelength of the sound wave. At this time, the positions of the walls correspond to the anti-nodes of the composite wave. In addition, since sound waves are generally hardly attenuated in a lower frequency range, standing waves are easily generated in a lower frequency range.

The sound of a frequency at which a standing wave is generated becomes too loud and booms at the position of a peak (anti-node), or is conversely hard to listen at the position of a dip (node), resulting in serious problems for human audibility. Hence, when a user wants to enjoy music from a speaker in a room, it is important to grasp the state of each standing wave generated in the listening area and, more particularly, the extreme points such as the peak and dip of each frequency component. Accurately grasping the extreme points of standing waves enables to cope with the standing waves by effectively using the information, for example, correct the sound field to suppress the standing waves or recommend an appropriate listening point.

Conventionally, to know the states of standing waves in a listening area, fixed-point measurement is conducted in general at several discrete points in the listening area, including a point in the listening area which is regarded by the user as the most important listening point. More specifically, a microphone is installed on a tripod or the like at each measurement point. The dip frequency (or peak frequency) of the measured frequency response is detected as the frequency at which a standing wave is generated. However, since a standing wave whose maximum amplitude is determined by its position in the space inevitably has position dependence, it is very difficult to detect the frequencies of all standing waves generated in the listening area based on the fixed-point measurement results at several discrete points. FIG. 19 is a graph showing an example of a result obtained by performing fixed-point measurement at 21 points at an interval of 10 cm on a 2-m direct path in an area assumed to be a listening area in an actual room. Each line of the graph corresponds to the result of one measurement point. For example, frequency components indicated by the arrows largely change the sound pressure levels depending on the measurement point, and are therefore supposed to be strong standing waves having high position dependence. When measurement is performed at discrete fixed points, and a measurement result (line of the graph) corresponding to a selected measurement point is the lowermost line at the frequency at which a standing wave is generated, the frequency is detected as a dip frequency (or if the line is uppermost, the frequency is detected as a peak frequency). In FIG. 19, however, if the line is almost at the center of the arrow, it is not recognized as a standing wave.

For the above-described reasons, to accurately grasp the states of standing waves with high position dependence, it is necessary to repeatedly perform fixed-point measurement at a fine measurement point interval. However, the fixed-point measurement at a fine measurement point interval increases the load on the user and requires long time. Japanese Patent Laid-Open No. 4-93727 proposes a method of introducing a mechanism for controlling a microphone position using a traversing device for automatic measurement.

There is also a method of calculating the frequency of a standing wave not by measurement but using theoretical expressions or simulations. The theoretical expression of a normal vibration mode frequency in a rigid rectangular parallelepiped room is given by $$f = c/2 \cdot \sqrt{\{(x/L)^2 + (y/W)^2 + (z/H)^2\}} \tag{1}$$

where f is the normal vibration mode frequency, c is the sound velocity, L, W, and H are the length, width, and height of the room, respectively, and x, y, and z are integers of 0 or more that specify the mode. However, since equation (1) is used to calculate the frequency, the strength of a standing wave such as the difference between the peak value and the dip value of each frequency component cannot be detected. In addition, since equation (1) assumes an ideal, rigid rectangular parallelepiped room, a deviation from the theoretical expression is generated depending on the actual room structure, the sound absorption characteristic of the walls, and the object layout. A sound field simulation method based on geometrical acoustics, wave acoustics, or the like may be applied in consideration of these conditions. However, considering the labor required for modeling, consistency with actual measured values is not sufficient. Japanese Patent Laid-Open No. 2007-158589 discloses a method of determining the frequency of a standing wave by combining fixed-point measurement and the theoretical expression of the normal vibration mode frequency and collating the dip frequency of a frequency response measured at one point with the theoretical expression.

However, the conventional standing wave detection method has the following problems. FIG. 10 shows another example of the measurement result in an actual room. As shown in FIG. 10, even in the same room, the frequency response largely changes, and the dip frequency varies depending on the measurement point. This indicates that it is very difficult to detect, based on the measurement result at a given point, the frequencies of all standing waves actually generated in the entire room. That is, the method of determining the frequency of a standing wave based on the dip of a measured frequency response allows to detect only the standing wave of a frequency corresponding to the node at the measurement point. In addition, the dip of the frequency response is not necessarily generated only by the standing wave, and a determination error is also possible. On the other hand, the method of calculating the frequency of a standing wave using the theoretical expression of the normal vibration mode frequency in a room assumes an ideal, rigid rectangular parallelepiped room. For this reason, a deviation from the theoretical expression is inevitably generated depending on the actual room structure, the sound absorption characteristic of the walls, and the object layout.

SUMMARY OF THE INVENTION

The present invention provides a technique of efficiently detecting a standing wave generated in a room.

According to one aspect of the present invention, a standing-wave detection apparatus for detecting a standing wave in a predetermined space, comprises: a sound-receiving unit adapted to receive a sound generated from a sound source arranged in the predetermined space; a storage unit adapted to store time series sound pressure level data acquired by the sound-receiving unit during movement along a path in the predetermined space; an adjustment unit adapted to adjust the time series sound pressure level data stored in the storage unit, based on an adjustment curve determined using a lower envelope of the time series sound pressure level data stored in the storage unit; and a detection unit adapted to detect an existence position of a standing wave in the predetermined space based on the adjusted time series sound pressure level data.

According to another aspect of the present invention, a method of controlling a standing-wave detection apparatus for detecting a standing wave in a predetermined space, comprises the steps of: receiving, from a sound-receiving unit, a sound generated from a sound source arranged in the predetermined space; storing, in a storage unit, time series sound pressure level data acquired in the step of receiving the sound during movement along a path in the predetermined space; adjusting the time series sound pressure level data stored in the storage unit, based on an adjustment curve determined using a lower envelope of the time series sound pressure level data stored in the storage unit; and detecting an existence position of a standing wave in the predetermined space based on the adjusted time series sound pressure level data.

According to the present invention, it is possible to provide a technique of efficiently detecting a standing wave generated in a room.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view showing an example of a standing wave map used to display detected standing waves;

FIG. 7 is a view showing an example of GUI display of guidance according to the second embodiment;

FIG. 8 is a block diagram of a standing wave detector according to the third embodiment;

FIG. 11 is a block diagram of a standing wave detection apparatus according to the fourth embodiment;

FIGS. 12A and 12B are flowcharts of a data analyzer according to the fourth embodiment;

FIG. 15 is a view showing an example of an allowable speed table;

FIGS. 17A and 17B are flowcharts of a data analyzer according to the fifth embodiment;

FIG. 20 is a graph for explaining the results of fixed-point measurement and mobile measurement of standing waves.

DESCRIPTION OF THE EMBODIMENTS

Figure 1:
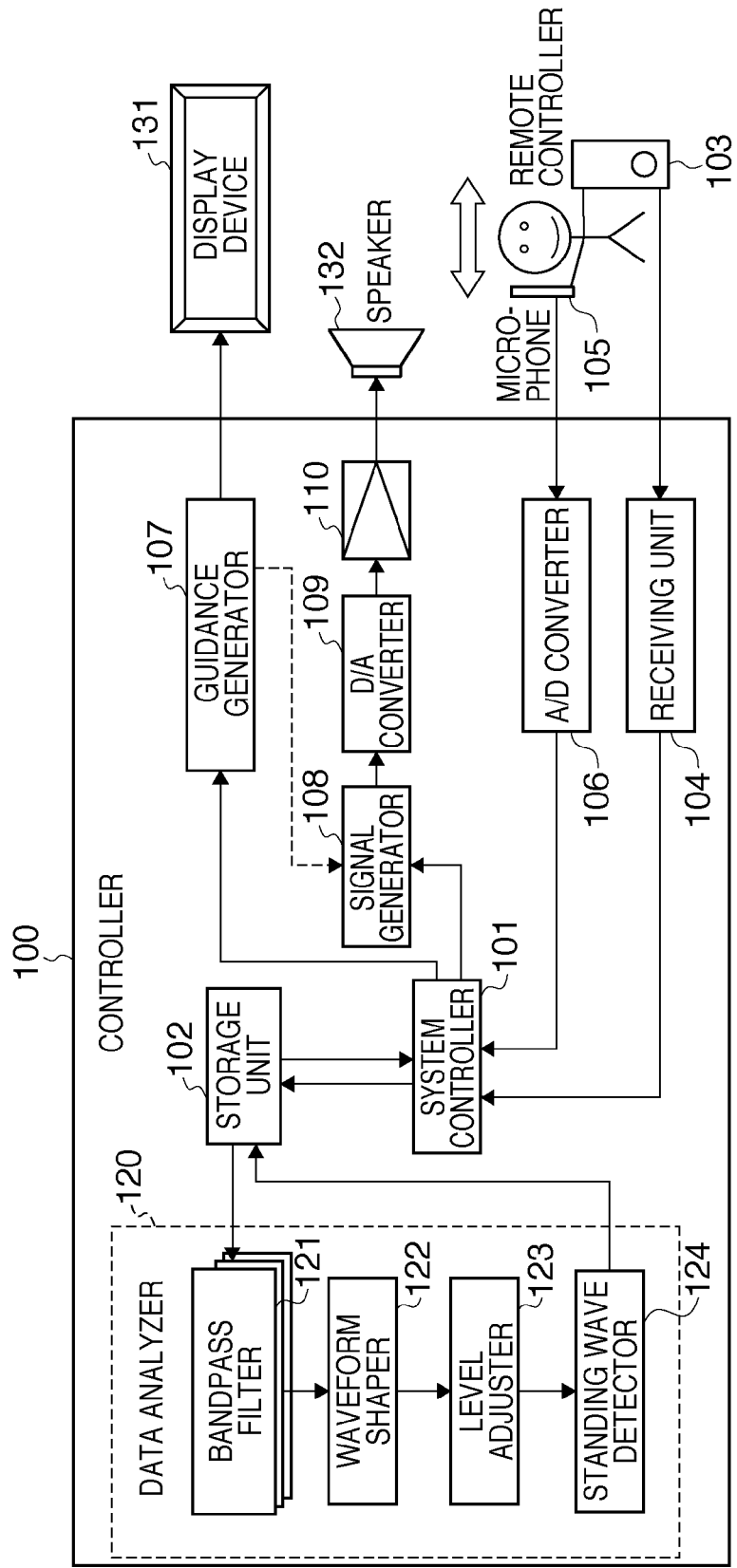
FIG. 1 is a block diagram of a standing wave detection apparatus according to the first embodiment.

Preferred embodiments of the present invention will now be described in detail in accordance with the accompanying drawings. Note that the following embodiments are not intended to limit the scope of the invention, but are merely examples.

(First Embodiment)

A standing wave detection apparatus according to the first embodiment of the present invention will be described below by exemplifying a standing wave detection apparatus for performing measurement while moving in a predetermined space.

Measurement (to be referred to as "mobile measurement" hereinafter) while moving in a predetermined space such as a room is a method of performing measurement continuously at positions while moving a microphone without stopping at each measurement point. FIG. 20 is a graph showing examples of sound pressure level (200-Hz component) measurement results in fixed-point measurement and mobile measurement. Reference numeral 2000a indicates a fixed-point measurement result; and 2000b and 2000c, mobile measurement results. Note that since the results 2000b and 2000c are obtained by measurement while moving, the abscissa represents both the position and the measurement time. Comparing the results 2000a and 2000b reveals that the dip near the center of the graph is more clearly detected by the mobile measurement. When all the extreme points are thus detected, it is possible to more accurately grasp the strength of the standing wave of each frequency component.

For the fixed-point measurement, setting the microphone and starting measurement based on a trigger need to be repeated as many times as the number of measurement points. Hence, a time of about 10 min was necessary for obtaining the data of the graph 2000a. In the mobile measurement, however, after triggering the start of measurement, it is necessary to only move along the same path as in the fixed-point measurement. For this reason, the time required to obtain the data of the graph 2000b was only about 8 sec.

<Arrangement of Apparatus>

FIG. 1 is a block diagram showing the functional arrangement of a standing wave detection apparatus according to the first embodiment. The standing wave detection apparatus includes a controller 100 which controls the entire apparatus, a display device 131 which presents information to the user, and a speaker 132 serving as a sound source arranged in a predetermined space such as a room. The controller 100 includes a system controller 101 which performs control, a storage unit 102 which stores measured data, and a data analyzer 120 which analyzes the measured data. The controller 100 also includes a receiving unit 104 which receives a signal from a remote controller 103 to be operated by the user, and an A/D converter 106 which receives an audio signal from a microphone 105 (audio input means; audio input unit) for collecting measured data. The controller 100 also includes a guidance generator 107 which generates an instruction content to the user, a signal generator 108 which generates a measurement signal, and a D/A converter 109 and amplifier 110 for outputting the audio signal to the speaker 132 serving as a sound source. The data analyzer 120 includes a plurality of bandpass filters 121, a waveform shaper 122, a level adjuster 123, and a standing wave detector 124. Note that FIG. 1 illustrates the remote controller 103 and the microphone 105 as individually movable devices. However, they may be integrated into one input device.

<Operation of Apparatus>

An example of a series of procedures until standing wave detection will be described below in detail. First, before starting standing wave detection, the user transmits a command to request display of a graphical user interface (GUI) from the remote controller 103 to the controller 100. The receiving unit 104 receives the command and inputs it to the system controller 101 which comprehensively controls the controller 100. Upon receiving the command, the system controller 101 causes the guidance generator 107 to generate a GUI, and displays the generated GUI on the display device 131.

The user operates the remote controller 103 while viewing the GUI displayed on the display device 131, thereby displaying a root menu for standing wave detection. Note that in the following explanation, guidance generated by the guidance generator 107 is displayed on the display device 131 and thus presented to the user. However, the display device 131 may be incorporated in the controller 100 as a display panel or the like. In addition, the guidance need not always be displayed as a GUI. The guidance generator 107 may generate an audio version of the same guidance. In this case, the generated audio guidance may be presented to the user as an audio guide output from the speaker 132 via the signal generator 108, D/A converter 109, and amplifier 110 (dotted arrow in FIG. 1).

When the user selects a menu of detection start from the root menu of standing wave detection by operating the remote controller 103, guidance to prompt, for example, standing wave measurement in the longitudinal direction of the room is displayed. Based on the guidance, the user holds the microphone 105, moves to the measurement start position (on the side of one of the two walls opposing in the longitudinal direction), and stands by.

When ready, the user operates the remote controller 103 to send a command to the controller 100 and notify it of the start of measurement. Triggered by this, the signal generator 108 generates a measurement signal to generate a sound from the speaker 132 via the D/A converter 109 and the amplifier 110. Note that if the speaker 132 is an active speaker incorporating an amplifier, the amplifier 110 in the controller 100 need not perform amplification. Note that as the measurement signal, for example, a signal of a sound such as band noise is used, which covers the frequency band in which a standing wave should be detected. Note that when the above-described audio guide (audio instruction) is formed from a sound in a frequency band different from the measurement signal, the user can do measurement while listening to the audio guide.

Simultaneously with the measurement signal generation, recording (storage control) of sound data (in the following explanation, general sound pressure level) from the microphone 105 to the storage unit 102 via the A/D converter 106 and the system controller 101 starts. The user continuously measures the sound pressure level concerning the position using the microphone 105 while slowly walking from the measurement start position to the opposite wall.

At this time, the height at which the user holds the microphone 105 is preferably the height of the user's ear when listening to music in the room. In the above example, the detection target of measurement in the longitudinal direction of the room is a standing wave in the first-order mode (y=z=0 in equation (1)) generated between the two parallel walls opposing each other. Hence, the user need not always walk on the center line of the room. Any other path parallel to the center line may be selected for the purpose of avoiding furniture in the room.

When continuous measurement is done concerning the position in accordance with the above-described procedure, instead of performing measurement at only one point in the room, it is possible to collect sound pressure level data to detect standing waves actually generated in the room for at least one direction (e.g., longitudinal direction) of the room.

<Data Analysis>

When the measurement along one path has finished in accordance with the above-described procedure, the data analyzer 120 starts analyzing the continuous sound pressure level data (time series sound pressure level data) stored in the storage unit 102. A procedure of causing the data analyzer 120 to analyze the data stored in the storage unit 102 to detect standing waves will be described below in more detail.

First, the sound pressure level data is sent to the bandpass filters 121 of the data analyzer 120. A plurality of (two or more) bandpass filters 121 of different pass bands are prepared in accordance with the frequency band of standing wave detection and a desired frequency resolution. Note that the bandpass filters perform well-known general processing, and a detailed description thereof will be omitted here. The sound pressure level data of each band extracted by each bandpass filter undergoes a series of processes by the remaining blocks of the data analyzer 120 (to be described below). If a standing wave is detected, it indicates that a standing wave in the frequency band under analysis at that time is generated. Note that the sound pressure level data of the bands may be acquired at once by Fourier transform of the original sound pressure level data without using the bandpass filters.

The sound pressure level data of a given band which has passed through the bandpass filter 121 is sent to the waveform shaper 122. The waveform shaper 122 performs noise removal and smoothing of continuous data, and corresponds to preprocessing for the level adjuster 123 that is the next processing block in the data analyzer 120. Noise removal and smoothing of data can be implemented by general-purpose processing such as (weighted) moving average, and a description thereof will be omitted here.

Next, the sound pressure level data which has undergone the noise removal and smoothing by the waveform shaper 122 is sent to the level adjuster 123. The level adjuster 123 removes a variation in the sound pressure level caused by the change in the relative positional relationship (distance change) between the speaker 132 that generates the measurement signal and the moving microphone 105.

Figure 2:
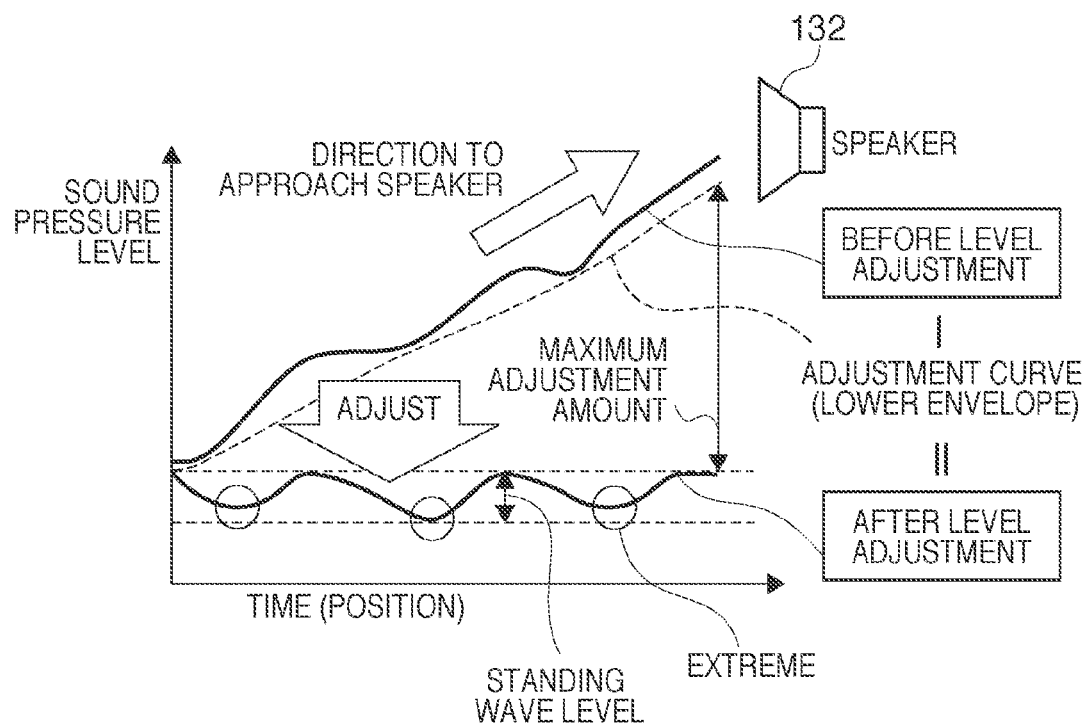
FIG. 2 is a graph illustrating an example of a variation in the sound pressure level in mobile measurement.

FIG. 2 is a graph illustrating an example of a variation in the sound pressure level in mobile measurement. Assume that the measurement path approaches the speaker 132. In this case, the sound pressure level data sent to the level adjuster 123 via the waveform shaper 122 exhibits a continuously growing waveform, as indicated by a line of "before level adjustment" in FIG. 2. The abscissa of the graph represents the time elapsed from the start of sound pressure level data accumulation, and corresponds to positions on the measurement path because the user performs measurement while moving. However, since the user's walking speed normally varies, the time and position do not always hold a linear relationship.

The standing wave detector 124 that is the processing block next to the level adjuster 123 detects the variation range and extrema of the sound pressure level data, thereby detecting standing waves. For this purpose, the level adjuster 123 needs to execute processing of, for example, adjusting the continuously growing waveform before adjustment in FIG. 2 to the waveform after level adjustment in FIG. 2 as preprocessing of the standing wave detector 124.

Figure 3:
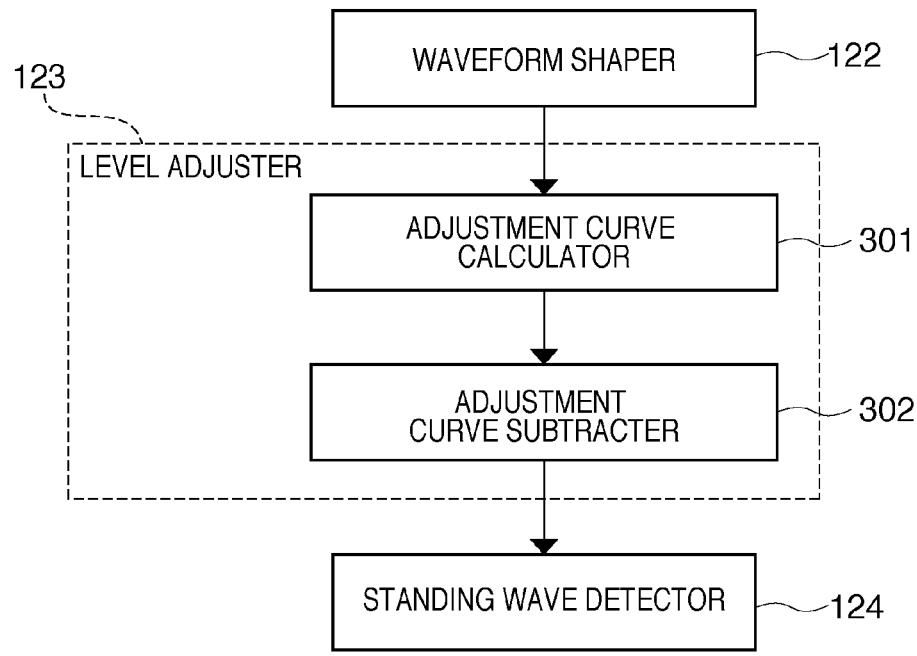
FIG. 3 is a block diagram of a level adjuster according to the first embodiment.

Details of the level adjuster 123 will be described below. FIG. 3 is a block diagram showing the internal arrangement of the level adjuster.

The level adjuster 123 causes an adjustment curve calculator 301 to obtain, for the sound pressure level data sent via the waveform shaper 122, an adjustment curve representing a level variation caused by the distance between the speaker 132 and the microphone 105. More specifically, the adjustment curve is obtained as the lower envelope of the data before adjustment, as shown in FIG. 2. A smooth envelope can be obtained because the waveform shaper 122 that is the processing block before the level adjuster 123 has shaped the waveform by noise removal and smoothing. Envelope calculation is general processing, and a detailed description thereof will be omitted here. Next, an adjustment curve subtracter 302 subtracts, from the sound pressure level value before adjustment, a value on the adjustment curve obtained by the adjustment curve calculator 301 at the corresponding point of time, thereby obtaining sound pressure level data after adjustment. The above-described function of the level adjuster 123 removes the level variation caused by the distance between the speaker 132 and the microphone 105. The sound pressure level data adjusted by the level adjuster 123 is sent to the standing wave detector 124. Note that in the above description, the adjustment curve is calculated based on the lower envelope of the data before adjustment. However, not the lower envelope but any other curve representing the global shape of the data before adjustment is also usable. Hence, the (weighted) moving average line of the data before adjustment using a wide averaging range or the upper envelope of the data before adjustment may be used as the adjustment curve. Since these adjustment curves other than the lower envelope have such shapes as obtained by translating the lower envelope in the vertical direction, subsequent processing of the adjustment curve subtracter 302 and the like can be the same as those in the case in which the adjustment curve is the lower envelope.

Figure 4:
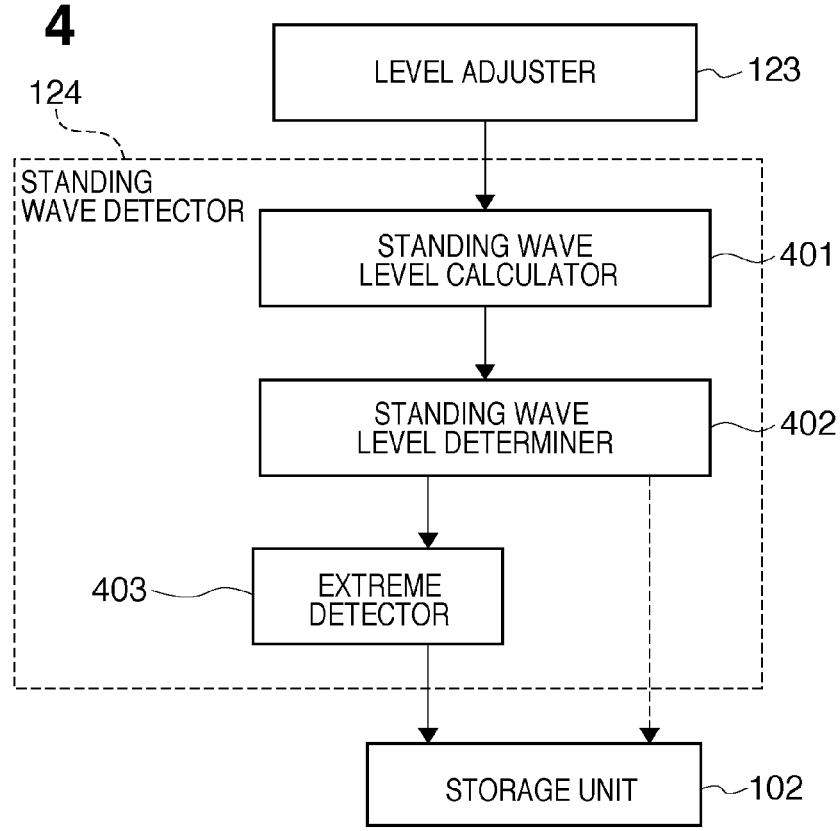
FIG. 4 is a block diagram of a standing wave detector according to the first embodiment.

Details of the standing wave detector 124 will be described below. FIG. 4 is a block diagram showing the internal arrangement of the standing wave detector.

The standing wave detector 124 causes a standing wave level calculator 401 to obtain the variation range of the sound pressure level of the sound pressure level data sent via the level adjuster 123. The variation range of the sound pressure level is the difference between the maximum value and the minimum value of the waveform after level adjustment in FIG. 2. This will be referred to as a standing wave level hereinafter. The level adjuster 123 that is the processing block before the standing wave detector 124 has removed the level variation caused by the distance between the speaker 132 and the microphone 105. For this reason, the standing wave level is supposed to purely represent the influence of only the characteristic of a standing wave.

A standing wave level determiner 402 of the next stage determines whether the magnitude of the standing wave level obtained by the standing wave level calculator 401 may pose a problem for detection. More specifically, the standing wave level is compared with a predetermined threshold. If the standing wave level exceeds the threshold, the process advances to an extreme detector 403 that is the next processing block. Conversely, if the standing wave level is equal to or less than the threshold, it is determined that no problem is posed for the sound of the frequency. Hence, the standing wave detector 124 ends the processing by skipping the extreme detector 403 (dotted arrow in FIG. 4).

The extreme detector 403 detects an extreme from the sound pressure level data when the standing wave level of the frequency band currently under analysis exceeds the threshold of the standing wave level determiner 402. As the sound pressure level, the square of (effective value/minimum audible sound pressure of human) of a positive/negative sound pressure representing coarseness/fineness based on the atmospheric pressure is expressed in decibels. For this reason, of the extrema including local minima and local maxima, the local minima that are the nodes of standing waves are easily detected considering the change in the gradient. Even in FIG. 2, local minima are detected from the waveform after level adjustment. In the following explanation as well, local minima are detected as extrema. Needless to say, standing waves can also be detected by detecting local maxima as the extrema.

To detect an extreme, a method of monitoring the difference value between adjacent data of continuous data is generally used. As shown in FIG. 2, the level adjuster 123 has adjusted the detection target data. Hence, extrema can easily be detected from the data after adjustment as compared to the data before adjustment. That is, the processing of the level adjuster 123 improves the extreme detection accuracy. However, accurate detection is difficult if the variation range of the detection target data is small. For this reason, extreme detection is not performed when the standing wave level is equal to or less than the threshold.

A standing wave has at least one local minimum (node). A node appears every half wavelength of the standing wave. When measurement is done from an end to the other end of the room, the approximate length of the room can be calculated by (number of local minima)×(half wavelength of sound) at the center frequency of the frequency band.

With the above-described procedure, the data analyzer 120 ends the processing for sound pressure level data in a given frequency band. Information including the standing wave levels and the number of local minima obtained by the processing is recorded in the storage unit 102 in a form that allows to look up by the measurement path and the frequency band. Additionally, the processing of the data analyzer 120 is repeated as many times as the number of bandpass filters 121, thereby completing detection of standing waves which are generated in the longitudinal direction of the room in the example. The same processing as described above is executed on a path in the widthwise direction of the room and then on a path along a diagonal on the floor (detection of standing waves in the second-order mode), thereby accumulating the information of standing waves actually generated in the room one by one.

When detection of standing waves is completed, the user can select detection result confirmation from the root menu for standing wave detection, and output the image. FIG. 5 is a view showing an example of a standing wave map used to display the detected standing waves. The standing wave map is rendered based on the center of the room using, out of the sound pressure level data of the respective measurement paths and frequency bands, data having at least one local minimum and high standing wave levels. In FIG. 5, the approximate size of the room is calculated and rendered based on the frequency and the number of local minima of each standing wave. The color of each standing wave is highlighted in accordance with the standing wave level.

As described above, the standing wave detection apparatus according to the first embodiment can efficiently detect standing waves generated in a room. The user refers to a standing wave map rendered based on the standing waves measured by the standing wave detection apparatus, thereby selecting an optimum listening point. This is also useful for automatic sound field correction targeted to the standing waves in accordance with the position of the user.

Note that in the above description, the user performs detection from standing waves in the first-order mode in accordance with an instruction from the controller 100. However, the user may manually set the measurement path in accordance with the mode of standing waves to be measured. The apparatus may be configured to receive input of the shape and size of the room from the root menu before measurement. The user may be able to designate the width of the pass band of each bandpass filter in accordance with the desired frequency resolution.

(Second Embodiment)

In the second embodiment, a standing wave detection apparatus having a level adjuster different from that of the first embodiment will be described. Note that the remaining components and operations are the same as in the first embodiment, and a description thereof will not be repeated.

<Arrangement of Apparatus>

Figure 6:
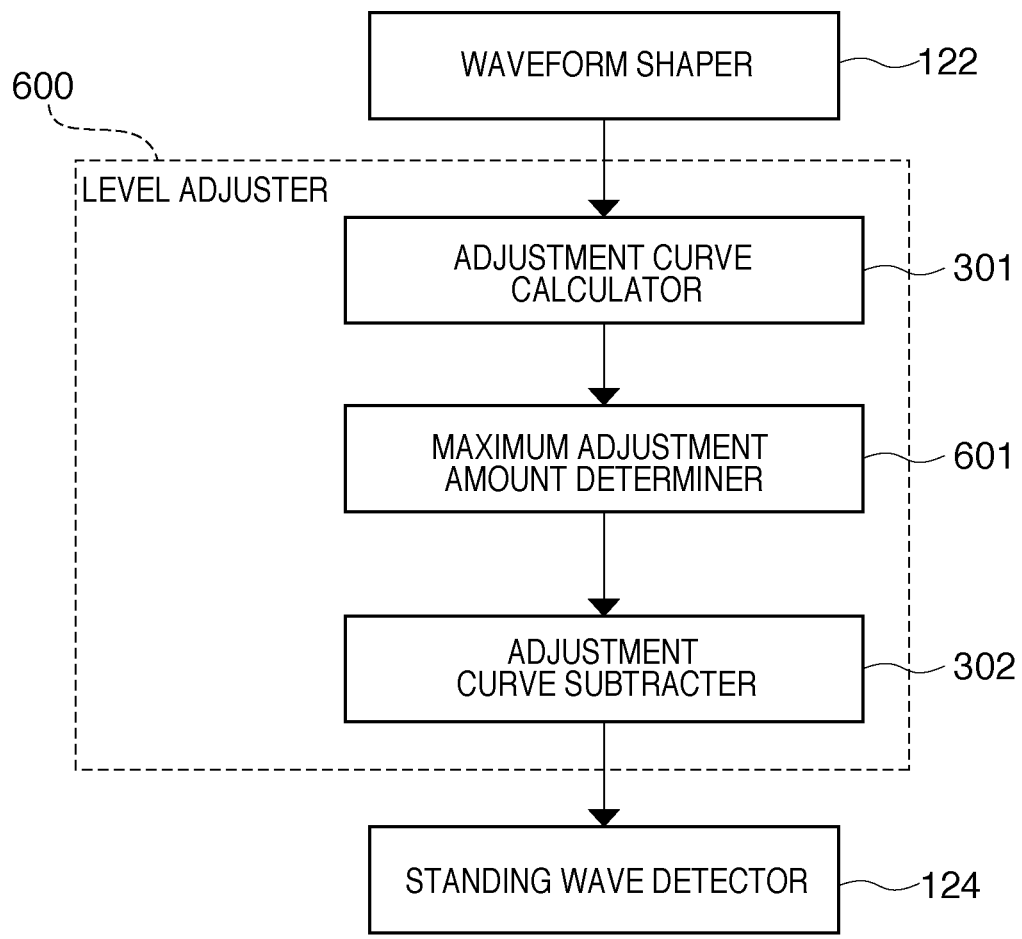
FIG. 6 is a block diagram of a level adjuster according to the second embodiment.

FIG. 6 is a block diagram showing a level adjuster 600 according to the second embodiment. Unlike the first embodiment, the level adjuster 600 includes a maximum adjustment amount determiner 601 as a processing block.

As described in the first embodiment, a level adjuster 123 removes a variation in the level caused by the distance between a speaker 132 and a microphone 105 from sound pressure level data. If the adjustment amount at that time is too large, it indicates that the measurement position of the microphone 105 is too close to the speaker 132. At this time, since the direct sound from the speaker 132 is superior to the reflected sound from the walls, the peaks and dips of standing waves are hard to recognize. Even after adjustment processing by the level adjuster 123, standing wave detection by a standing wave detector 124 of the next stage is difficult.

To prevent this, the maximum adjustment amount determiner 601 in the level adjuster 600 according to the second embodiment determines whether the maximum adjustment amount (in the example of FIG. 2, the value at the right end of the adjustment curve) of the adjustment curve obtained by an adjustment curve calculator 301 exceeds a predetermined threshold. If the maximum adjustment amount exceeds the threshold, a flag representing it is stored in a storage unit 102.

More specifically, when data analysis of measured data on a given path has ended, a guidance generator 107 generates guidance and presents it to the user via a display device 131 in accordance with the content of the flag before measurement of the next path starts. That is, guidance to prompt re-measurement at a position far apart from the speaker 132 is made. For example, if the measurement path is set in the longitudinal direction of the room, GUI display as shown in FIG. 7 is done, and re-measurement on a path translated in a direction to be separated from the speaker 132 is prompted.

The above-described arrangement of the standing wave detection apparatus makes it possible to more accurately detect standing waves.

(Third Embodiment)

In the third embodiment, a standing wave detection apparatus having a standing wave detector different from that of the first embodiment will be described. Note that the remaining components and operations are the same as in the first embodiment, and a description thereof will not be repeated.

<Arrangement of Apparatus>

FIG. 8 is a block diagram showing a standing wave detector 800 according to the third embodiment. Unlike the first embodiment, the standing wave detector 800 includes an extreme interval determiner 801 as a processing block.

As described in the first embodiment, a standing wave detector 124 detects the variation range (standing wave level) and extrema of sound pressure level data adjusted by a level adjuster 123, thereby detecting standing waves. An extreme is a local minimum or local maximum which preferably appears every half wavelength of a wavelength determined by the frequency of a standing wave, i.e., the extrema preferably have a predetermined interval.

However, since the walking speed of the user varies in fact, the extreme interval is not always predetermined and varies to some extent. If the extreme interval variation is too large, or the extreme interval is too narrow or too wide, appropriate extreme detection, i.e., appropriate standing wave detection may be impossible.

To prevent this, the extreme interval determiner 801 provided after an extreme detector 403 in the standing wave detector 800 according to the third embodiment determines whether the interval between the extrema detected by the extreme detector 403 satisfies a predetermined condition. If the interval between the detected extrema satisfies the predetermined condition, a flag representing it is stored in a storage unit 102.

More specifically, when data analysis of measured data on a given path has ended, a guidance generator 107 generates guidance and presents it to the user via a display device 131 in accordance with the content of the above-described flag before measurement of the next path starts.

Figure 9:
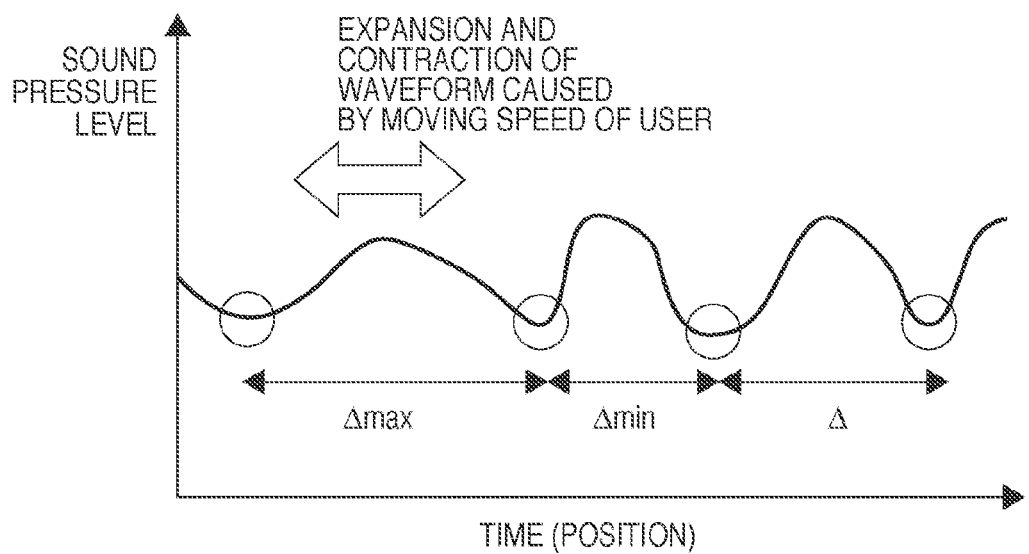
FIG. 9 is a graph for explaining the extreme interval of a standing wave.
Figure 10:
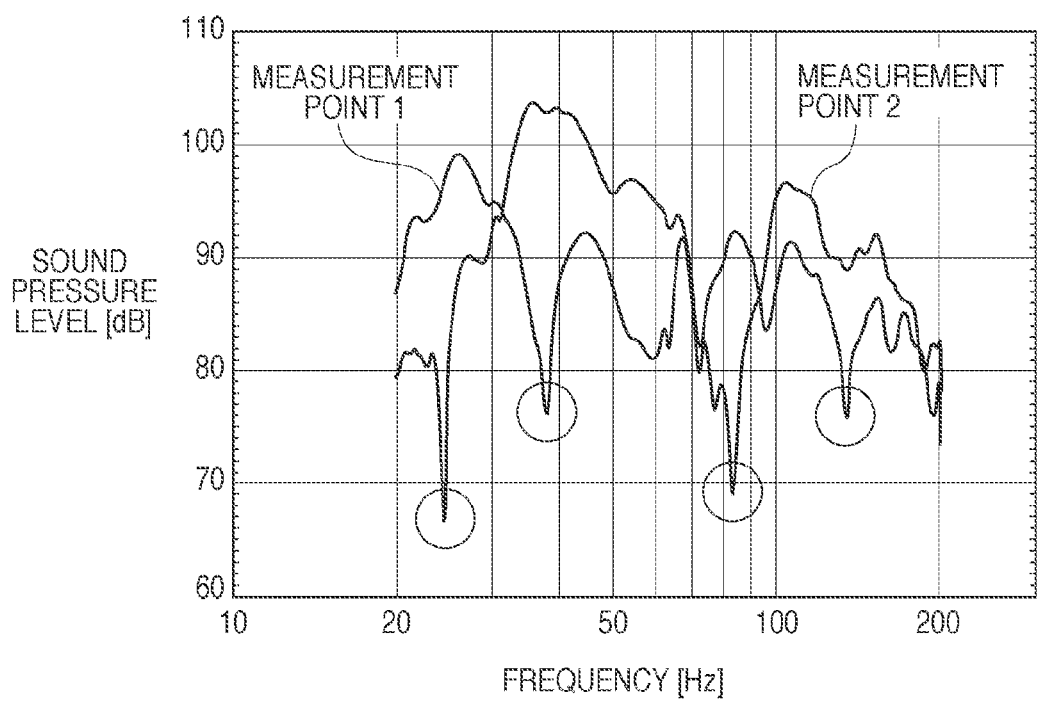
FIG. 10 is a graph showing an example of a measurement result in an actual room.

As shown in FIG. 9, the extrema are assumed to be local minima. Let Δmax be the maximum extreme interval, and Δmin be the minimum extreme interval. Conditions to determine the extreme interval and the corresponding guidance are as follows.

When Δmax−Δmin>a is satisfied, guidance prompts the user to do re-measurement while walking at a constant speed because the extreme interval varies, When Δmin<b is satisfied, guidance prompts the user to do re-measurement while walking more slowly because the extreme interval is too narrow, and When Δmax>c is satisfied, guidance prompts the user to do re-measurement while walking more quickly because the extreme interval is too wide, where a, b, and c are thresholds in the determination conditions, which may be changed in accordance with the analysis target frequency.

Note that when the user performs re-measurement based on the guidance, the guidance generator 107 preferably generates a signal to instruct the desired pace of the user in accordance with the content of the above-described flag. In this case, the user can do re-measurement at a pace based on the pace instruction signal contained in the guidance. Examples of the pace instruction signal are a blinking signal corresponding to the pace using the display device 131 and an intermittent tone corresponding to the pace using a signal generator 108 and a speaker 132.

The above-described arrangement of the standing wave detection apparatus makes it possible to more accurately detect standing waves.

(Fourth Embodiment)

In the fourth embodiment, an arrangement will be described, which predicts the positions of the extrema of standing waves in mobile measurement, and do feedback to the measurement operation.

The graph 2000c is a graph showing the measurement result of mobile measurement on the path of the measurement, like the graph 2000b. The moving speed of mobile measurement in the graph 2000b is about 0.25 m/s. However, the moving speed in the graph 2000c is about 0.5 m/s. As a result, the graph 2000c looks like the graph 2000b with the moving average. The range of the sound pressure level is compressed, and the dip is hard to recognize. In the fourth embodiment, the position of each extreme of standing waves is predicted in mobile measurement, and the moving speed near the predicted point is controlled, thereby accurately measuring standing waves.

<Arrangement of Apparatus>

FIG. 11 is a block diagram showing the functional arrangement of a standing wave detection apparatus according to the fourth embodiment. The major components are the same as in the first embodiment. The standing wave detection apparatus further includes a traversing device 140 (driving means) which controls the three-dimensional position and speed of a microphone. The traversing device 140 is configured to receive control from a system controller 101 (remote control means). Note that the system controller 101 (position detection means) is configured to detect the position of the traversing device 140.

Before measurement, the user sets the traversing device 140 such that a movable portion 142 of the traversing device 140 can cover a standing wave detection area (generally, listening area). A microphone 105 is fixed on the movable portion 142 of the traversing device 140.

<Operation of Apparatus>

An example of a series of procedures until standing wave detection will be described below in detail. First, before starting standing wave detection, the user transmits a command to request GUI display from a remote controller 103 to a controller 100. Upon receiving the command that has been received by a receiving unit 104 and passed through the system controller 101 which comprehensively controls the controller 100, a guidance generator 107 generates a GUI. The GUI is displayed on a display device 131.

The user operates the remote controller 103 while viewing the GUI, thereby displaying a root menu for standing wave detection. Note that in the following explanation, guidance generated by the guidance generator 107 is displayed on the display device 131 and thus presented to the user. However, the display device 131 may be incorporated in the controller 100 as a display panel or the like. In addition, the guidance need not always be displayed as a graphic. The guidance generator 107 may generate an audio version with the same contents, and present the generated audio guidance to the user as an audio guide output from a speaker 132 via a signal generator 108, D/A converter 109, and amplifier 110.

From the root menu for standing wave detection, the user can input, via the remote controller 103, set values concerning the traversing device 140 and a data analyzer 120 in the controller 100 as input of various kinds of data. As setting concerning the traversing device 140, for example, the height of the movable portion 142 is designated in consideration of the length of the microphone. This enables to search the measurement target area while maintaining a predetermined height during mobile measurement.

In general, the height of the microphone for measurement is preferably the height of the user's ear (about 1 m) when he/she sits and listens to music in the room. In addition, for the movable range of the movable portion 142, the coordinate values of at least two of the four corners are preferably input based on the coordinate system of the room where the measurement is to be performed. This associates the coordinate system of the traversing device 140 with that of the room so that information about the measurement using the traversing device 140 can be described on the coordinate system of the room. Settings concerning the data analyzer 120 include a lower limit f1 and upper limit f2 of the frequencies of standing waves to be detected and a desired frequency resolution df. When the user does not input these set values, default values such as f1=20 Hz and f2=200 Hz are used for, e.g., the target frequency range.

When the user selects a menu of detection start from the root menu of standing wave detection by operating the remote controller 103, the microphone 105 fixed on the movable portion 142 of the traversing device 140 moves to the measurement start position, for example, one of the four corners of the movable range. The signal generator 108 generates a measurement signal, and directly records it in a storage unit 102 as an original signal. On the other hand, a sound is generated from the speaker 132 via the D/A converter 109 and the amplifier 110. Note that if the speaker 132 is an active speaker incorporating an amplifier, the amplifier 110 in the controller 100 need not perform amplification. As the measurement signal, for example, MLS (Maximum Length Sequence) is used. Its period corresponds to the length of a time window in the data analyzer 120 to be described later. Alternatively, noise such as white noise or band noise that covers the target frequency range from f1 to f2 may be used.

Simultaneously with the measurement signal generation, recording of the time series data of a microphone pickup signal (in the following explanation, general sound pressure level) from the microphone 105 to the storage unit 102 via an A/D converter 106 and the system controller 101 starts.

When microphone pickup signal recording in the storage unit 102 starts, the microphone 105 fixed on the movable portion 142 of the traversing device 140 starts mobile measurement at an initial speed v0 (how to determine v0 will be described later) in, for example, the longitudinal direction of the measurement target area. As described above, the detection accuracy of the extrema of standing waves to be detected is influenced by the moving speed of the microphone 105. Hence, the data analyzer 120 sequentially analyzes the microphone pickup signals recorded in the storage unit 102, and predicts the position of the extreme of a standing wave for each frequency. A desired instruction speed is determined based on the prediction result and the current moving speed, and sent from the data analyzer 120 to a traversing controller 141 via the system controller 101.

The traversing controller 141 constructs a servo system and performs, for example, PID control to make the moving speed of the microphone 105 on the movable portion 142 follow up the instruction speed sent from the system controller 101. If the movable portion 142 is not of a rail type but an articulated arm such as a manipulator, the traversing controller 141 has a kinematic model which associates each joint variable of the arm with the position/orientation/speed of the distal end of the arm.

<Data Analysis>

As described above, when the measurement along a path has started, the data analyzer 120 starts analyzing the continuous sound pressure data (microphone pickup signal) stored in the storage unit 102. A procedure of causing the data analyzer 120 to analyze the data stored in the storage unit 102 to detect standing waves will be described below in more detail.

Figure 12A:
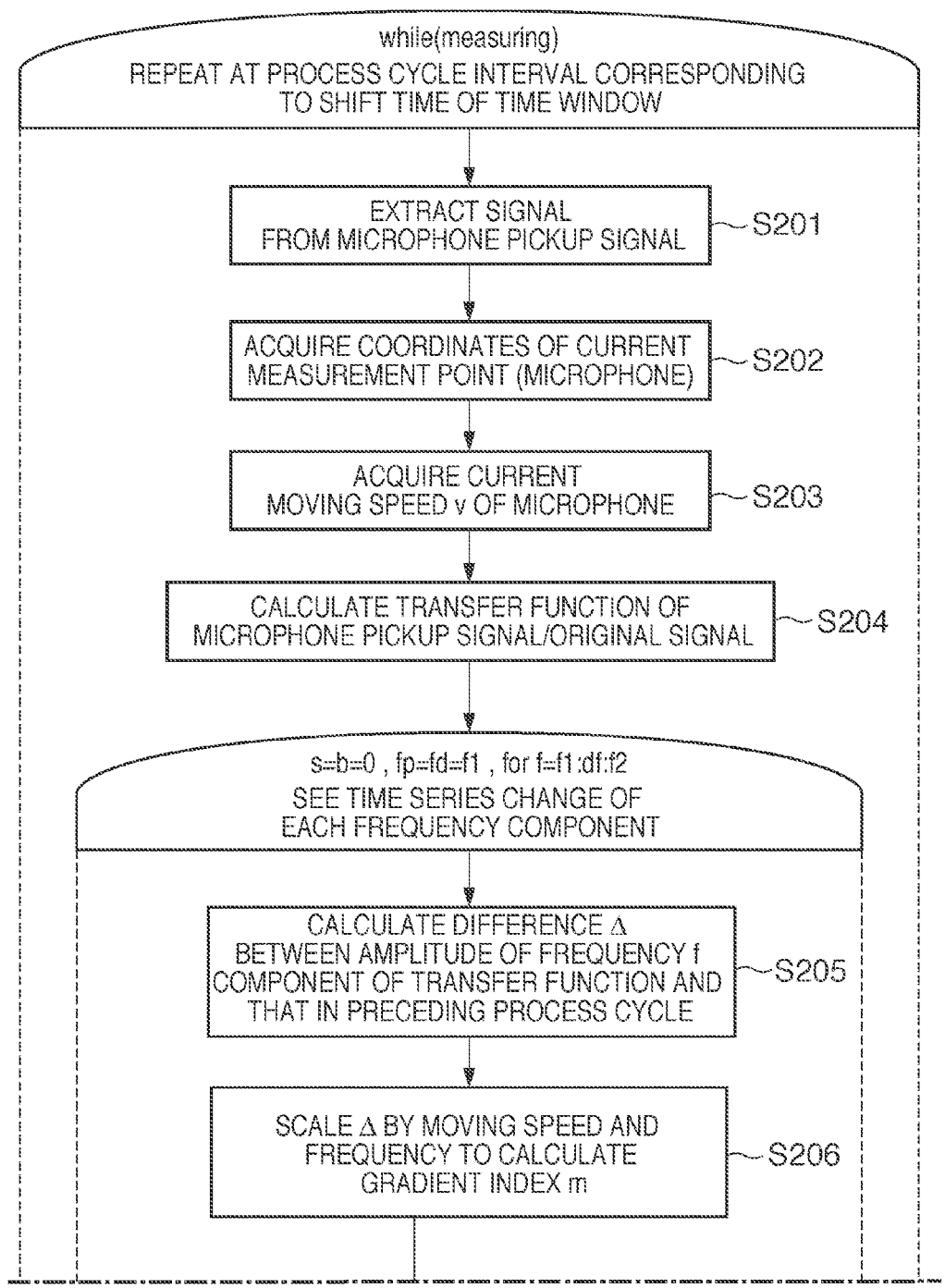

FIGS. 12A and 12B are flowcharts of data analysis by the data analyzer.

In step S201, the microphone pickup signal recorded in the storage unit 102 is extracted using a time window. If frequency analysis of the extracted time signal is to be performed by Fourier transform in a step later, the frequency resolution is determined by the time length. Hence, the length of the window is determined by the desired frequency resolution df. First, extraction is done when microphone pickup signals corresponding to the length of the time window are accumulated in the storage unit 102. From then on, signal extraction is performed every time microphone pickup signals corresponding to the shift amount of the time window are recorded in the storage unit 102, and the remaining processing of the flowchart is executed. Hence, the process cycle interval of the entire flowchart during measurement equals a time corresponding to the shift amount of the time window.

In step S202, at the timing of the signal extraction in step S201, the coordinates of the microphone 105 on the movable portion 142 are acquired from the traversing controller 141 via the system controller 101.

In step S203, at the timing of the signal extraction in step S201, the moving speed of the microphone 105 on the movable portion 142 is acquired from the traversing controller 141 via the system controller 101. If not the moving speed but only the position of the microphone 105 can be acquired, the moving speed is calculated in step S203 based on the process cycle interval and the difference between the coordinates obtained in step S202 and those in the immediately preceding process cycle.

In step S204, the transfer function of microphone pickup signal/original signal is calculated from the original signal recorded in the storage unit 102 and the microphone pickup signal extracted in step S201. Generally, when calculating the transfer function, the signal sequence pattern of the input signal preferably matches that of the output signal assuming that the signal sequences are made periodical. The microphone pickup signal contains a delay from the original signal, which is caused by the distance between the speaker 132 and the microphone 105. When the period of the MLS serving as the measurement signal is adjusted to the length of the time window in step S201, the above-described condition is almost satisfied by the periodicity of the MLS. The transfer function calculation itself is known processing, and a detailed description thereof will be omitted here.

Next, a loop for performing, for each frequency, processing for the transfer function calculated in step S204 starts. More specifically, the processing in the loop is repeated at the frequency interval of the frequency resolution df from the lower limit f1 to the upper limit f2 of the target frequency range. Only before the first loop, initialization is executed to initialize variables s and b to zero and variables fp and fd to f1. The variable s stores the number of frequency components determined to approach extreme points. The variable b stores the number of frequency components determined to have missed extreme points. The variable fp stores the maximum frequency that satisfies the determination conditions concerning a peak out of the extreme points. The variable fd stores the maximum frequency that satisfies the determination conditions concerning a dip out of the extreme points.

In step S205, a difference Δ between an amount that expresses the amplitude of the target frequency of the transfer function in decibels as a sound pressure level and that in the preceding process cycle is calculated. The positions of extreme points of standing waves are predicted by monitoring the time series change amount of the target frequency component such as Δ.

Directly using the difference Δ for extreme point prediction is not preferable due to the following two reasons.

The absolute value of the difference Δ tends to be larger as the position change of the microphone 105 between the process cycles becomes larger, i.e., the moving speed of the microphone 105 becomes higher because spatially remote two points of a standing wave are observed.

Figure 13:
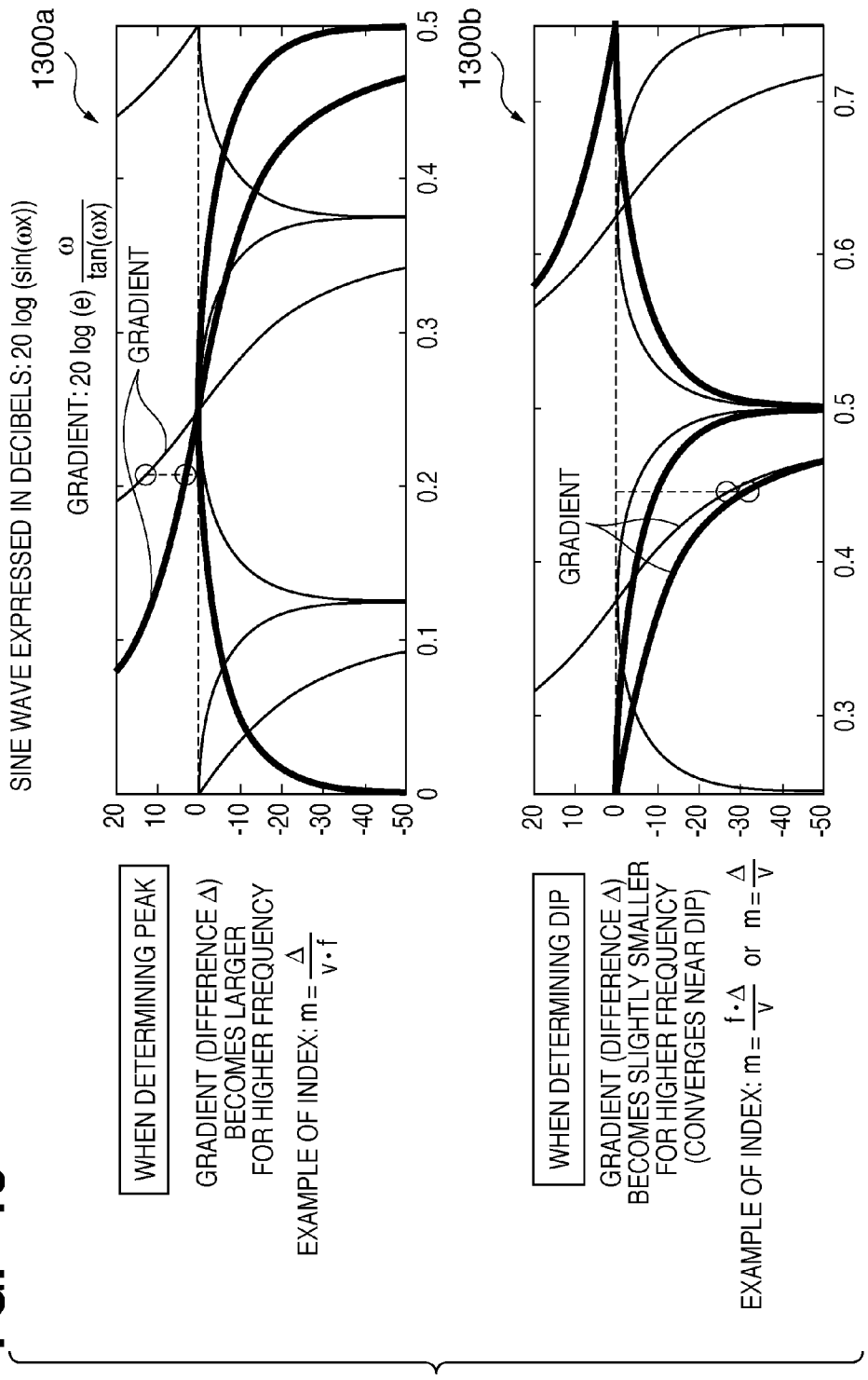
FIG. 13 shows graphs for explaining the concept of a gradient index.

The difference Δ depends on the frequency both near a peak position and near a dip position. FIG. 13 shows graphs of the sine waves of two frequencies which are expressed in decibels as sound pressure levels and their gradients (differential values). The frequency of a sine wave corresponding to the graph of a thin line is twice the frequency of a sine wave corresponding to the graph of a bold line. As is apparent from the graphs displayed with peaks made to match (display 1300a), the absolute value of the gradient near the peak is larger for the higher frequency. Hence, near the peak, the higher the frequency is, the larger the absolute value of the difference Δ is. The peak of the standing wave which is predicted when the gradient comes close to zero is determined with a delay. On the other hand, when displaying the graphs with dips made to match (display 1300b), the absolute value of the gradient near the dip is slightly smaller for the higher frequency. However, the gradient difference by the frequency becomes smaller as the position comes close to the dip.

In step S206, considering that the magnitude of Δ is influenced by the moving speed of the microphone 105 and the target frequency, as described above, the difference Δ is scaled by a moving speed v and a frequency f, thereby calculating a gradient index m. By introducing the gradient index m, predetermined thresholds can be set for determination conditions in steps S208, S210, S212, and S214.

Considering that the higher the moving speed is, or the higher the frequency is, the larger |Δ| is, the gradient index near the peak is given by, for example, $$m=\Delta/(v \cdot f) \tag{2}$$

In fact, scaling is done not using such simple form but by more specifically reflecting the relation between v, f, and Δ such that |m| monotonically decreases concerning v and f. Next, considering that the higher the moving speed is, the larger |Δ| is, and the higher the frequency is, the smaller Δ is, the gradient index near the dip is given by, for example, $$m=(f \cdot \Delta)/v, \text{ or } m=\Delta/v \tag{3}$$

In this case as well, scaling is actually done not using such simple form but by more specifically reflecting the relation between v, f, and Δ such that |m| monotonically decreases concerning v, and monotonically increases concerning f.

In the following determination conditions for extreme points, the gradient index m is calculated based on equation (2) in the determination condition of a peak and based on equation (3) in the determination condition for a dip. Let m2 be the gradient index in the current process cycle, and m1 be that in the immediately preceding process cycle.

In step S207, the product of a difference Δ2 in the current process cycle and a difference Δ1 in the preceding process cycle is calculated, and passage through an extreme point is determined based on the sign change of the difference. Not the gradient index m but the difference Δ is used because scaling concerning the magnitude does not influence the sign change determination.

$$\Delta 1 \cdot \Delta 2 < 0 \tag{4}$$

If the determination result of inequality (4) is false, no sign change has occurred, i.e., no extreme point passage has occurred, and the process advances to the determination condition for approach to an extreme point. On the other hand, if the determination result of inequality (4) is true, extreme point passage has occurred, and the process advances to the determination condition for extreme point detection.

Figure 14:
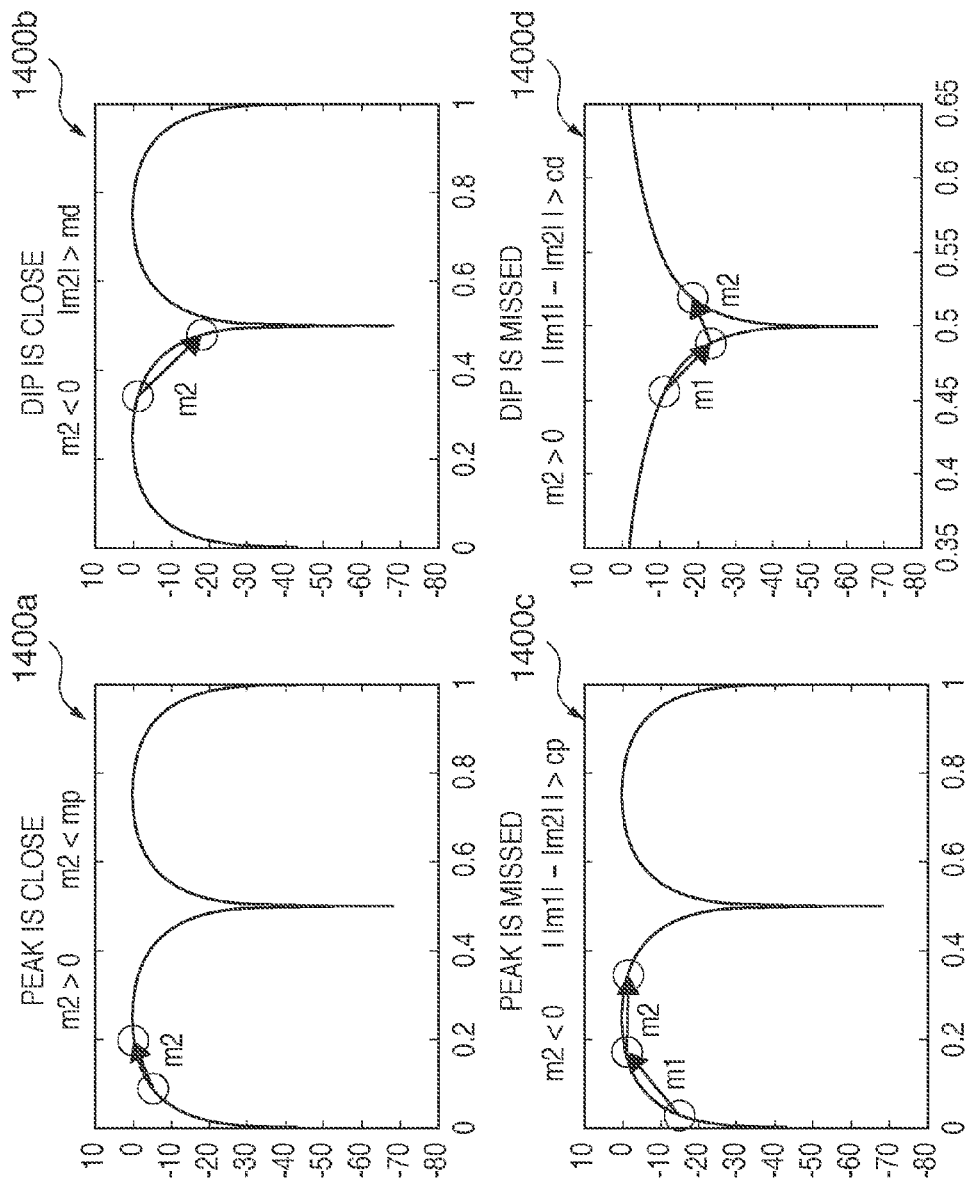
FIG. 14 shows graphs for explaining prediction of an extreme point of a standing wave.

FIG. 14 illustrates patterns to determine approach to a peak/dip or detection of a peak/dip.

In step S208, as indicated by 1400a, approach to a peak is determined using a determination condition given by $$m2>0, \text{ and } m2<mp \tag{5}$$

where mp is a predetermined threshold. If the determination result of inequalities (5) is true, it is determined that the peak of the target frequency component is close, and the process advances to step S209.

In step S209, the variable s which stores the number of frequency components determined to approach extreme points is incremented, and the variable fp which stores the frequency that satisfies the determination conditions concerning a peak is overwritten. When overwritten, the variable fp finally represents the maximum frequency that satisfies the determination conditions concerning a peak.

In step S210, as indicated by 1400b, approach to a dip is determined using a determination condition given by $$m2<0, \text{ and } |m2|>md \tag{6}$$

where md is a predetermined threshold. If the determination result of inequalities (6) is true, it is determined that the dip of the target frequency component is close, and the process advances to step S211.

In step S211, the variable s is incremented, and the variable fd which stores the frequency that satisfies the determination conditions concerning a dip is overwritten.

In step S212, as indicated by 1400c, detection of a peak is determined using a determination condition given by $$m2<0, \text{ and } ||m1|-|m2||>cp \tag{7}$$

where cp is a predetermined threshold. If an extreme point is detected, the arrow lines corresponding to the gradient indices m1 and m2 are supposed to be almost symmetrical in the horizontal direction. Hence, the determination is done based on the absolute value of the difference between the absolute values of the gradient indices. If the determination result of inequalities (7) is true, it is determined that the peak of the target frequency component has been missed, and the process advances to step S213.

In step S213, the variable b which stores the number of frequency components determined to have missed extreme points is incremented, and the variable fp which stores the frequency that satisfies the determination conditions concerning a peak is overwritten.

In step S214, as indicated by 1400d, detection of a dip is determined using a determination condition given by $$m2>0, \text{ and } ||m1|-|m2||>cd \tag{8}$$

where cd is a predetermined threshold. If the determination result of inequalities (8) is true, it is determined that the dip of the target frequency component has been missed, and the process advances to step S215.

In step S215, the variable b is incremented, and the variable fd which stores the frequency that satisfies the determination conditions concerning a dip is overwritten.

Steps S205 to S215 described above correspond to the determination processing for an extreme point of a given frequency, which is repeated for the frequency range from f1 to f2 by the loop. Note that the same processing can be implemented by directly using Δ for the determination conditions of steps S208, S210, S212, and S214 in place of m and scaling the thresholds of the determination conditions by the moving speed and frequency based on equations (2) and (3).

In step S216 that is the first step after exiting from the loop, the current moving speed v of the microphone 105 is compared with an allowable speed vth determined by the determination result for the extreme point in the loop. The allowable speed vth enables to detect all extreme points that satisfy the determination conditions in the loop if the actual moving speed v is equal to or lower than vth. More specifically, vth is obtained by $$vth=\min(vp(fp),vd(fd)) \tag{9}$$

where min is a function that returns the minimum values of two arguments delimited by a comma, vp is the allowable speed for a peak out of the extreme points, which is determined by the maximum frequency fp that satisfies the determination conditions concerning a peak, and vd is the allowable speed for a dip out of the extreme points, which is determined by the maximum frequency fd that satisfies the determination conditions concerning a dip.

FIG. 15 is a view showing a table of vp and vd for each frequency. The table is stored in the storage unit 102. If there is no data of a desired frequency, it is obtained by interpolating the data of close frequencies.

An example of the concept of obtaining the allowable speed vth by calculation will be described below. Let tw be the length of the time window when extracting the signal in step S201, and λf be the wavelength of the standing wave of the frequency f. If the ratio of a distance (tw·v) of movement for the length tw of the time window to the wavelength f is equal to or less than a predetermined value α, the moving speed v at that time is supposed to be sufficient for extreme point detection.

$$(tw \cdot v)/\lambda f \leq \alpha \tag{10}$$

When the equal sign of inequality (10) holds, and it is solved for v, the allowable speed vth can be calculated as the function of the frequency by $$vth(f)=(\alpha \cdot \lambda f)/tw \tag{11}$$

When αp and αd are individually defined for the peak and dip, and αp>αd is set assuming that αd needs to be smaller than αp, the table as shown in FIG. 15 is obtained.

The reason why the maximum frequency that satisfies the determination conditions is stored in the extreme point prediction is as follows. Since the allowable speed vth monotonically decreases for the frequency, as is apparent from equation (11), the allowable speed that allows to detect extreme points up to the maximum frequency can be known by grasping the maximum frequency. The initial speed v0 of the microphone 105 at the start of measurement is preferably set to vd(f2). This enables to detect the dip of the f2 component that is the upper limit of the target frequency range even if the dip is close to the measurement start point. Before entering the loop concerning the extreme point determination, fp and fd are initialized to f1. Hence, the moving speed is always guaranteed to be equal to or lower than vd(f1).

In step S216, the above-described allowable speed vth is compared with the actual moving speed v. If v≦vth, it is determined that no problem is posed in terms of extreme point detection. That is, even if there is an extreme point determined in step S212 or S214 to have been missed in detection, it is supposed to be within the error range. However, if v<vth, the measurement time is wasted, and the process advances to step S217. On the other hand, if the actual moving speed v exceeds the allowable speed vth in step S216, the process advances to step S218 to execute processing to cope with it.

In step S217, to shorten the measurement time while maintaining the extreme point detection accuracy, an instruction content to raise the instruction speed to vth is determined, and the processing in the current process cycle ends.

In step S218, the number b of frequency components determined to have missed extreme points is compared with a predetermined threshold bth. If the number exceeds the threshold, the process advances to step S219 to cope with it. For example, the threshold bth is set to 0. In this case, if at least one frequency is determined to have missed an extreme point, processing is performed to cope with it. If the determination condition of step S218 is false, the process advances to step S220.

In step S219, the measurement point is returned to that in the preceding process cycle, and re-measurement is performed because the moving speed exceeds the allowable speed vth, and an extreme point has been missed. More specifically, an instruction content to invert the sign of the instruction speed to return the measurement point to the preceding measurement point and perform re-measurement at the instruction speed vth is determined, and the processing in the current process cycle ends.

In step S220, the number s of frequency components determined to approach extreme points is compared with a predetermined threshold sth. If the number exceeds the threshold, the process advances to step S217 to cope with it. For example, the threshold sth is set to 0. In this case, if at least one frequency is determined to approach an extreme point, processing is performed to cope with it. In step S217, an instruction content to reduce the instruction speed to with to guarantee the extreme point detection accuracy is determined, and the processing in the current process cycle ends. If the determination condition of step S220 is also false, the processing in the current process cycle ends without updating the instruction content in the preceding process cycle.

When a machine control system such as the traversing device 140 always makes the moving speed of the microphone 105 follow up the instruction speed, the moving speed is adjusted sequentially in accordance with the extreme point approach determination result. Hence, missing an extreme point is fundamentally supposed not to occur. However, an asymmetrical sign change of the gradient index may occur due to, for example, unexpected noise. In such a case, it is effective to return the measurement point to the preceding one and perform re-measurement.

The microphone 105 searches the measurement target area along a predetermined path while repeating the flowchart of FIGS. 12A and 12B. The sound data obtained by predicting extreme points and coping with them is recorded in the storage unit 102 for each process cycle together with the coordinates, moving speed, and allowable speed of the microphone 105. When re-measurement is performed, the data are overwritten and updated. When the search of the measurement target area has ended, sound generation from the speaker 132 stops, and the mobile measurement ends.

As described above, the standing wave detection apparatus according to the fourth embodiment can predict the extreme points of standing waves generated in a room during mobile measurement. When feedback control to the moving speed of the microphone is sequentially executed based on the extreme point prediction result, measurement time shortening and accurate extreme point detection can be implemented simultaneously.

(Fifth Embodiment)

In the fifth embodiment, an arrangement for detecting standing waves using stereo sound sources will be described.

<Arrangement of Apparatus>

Figure 16:
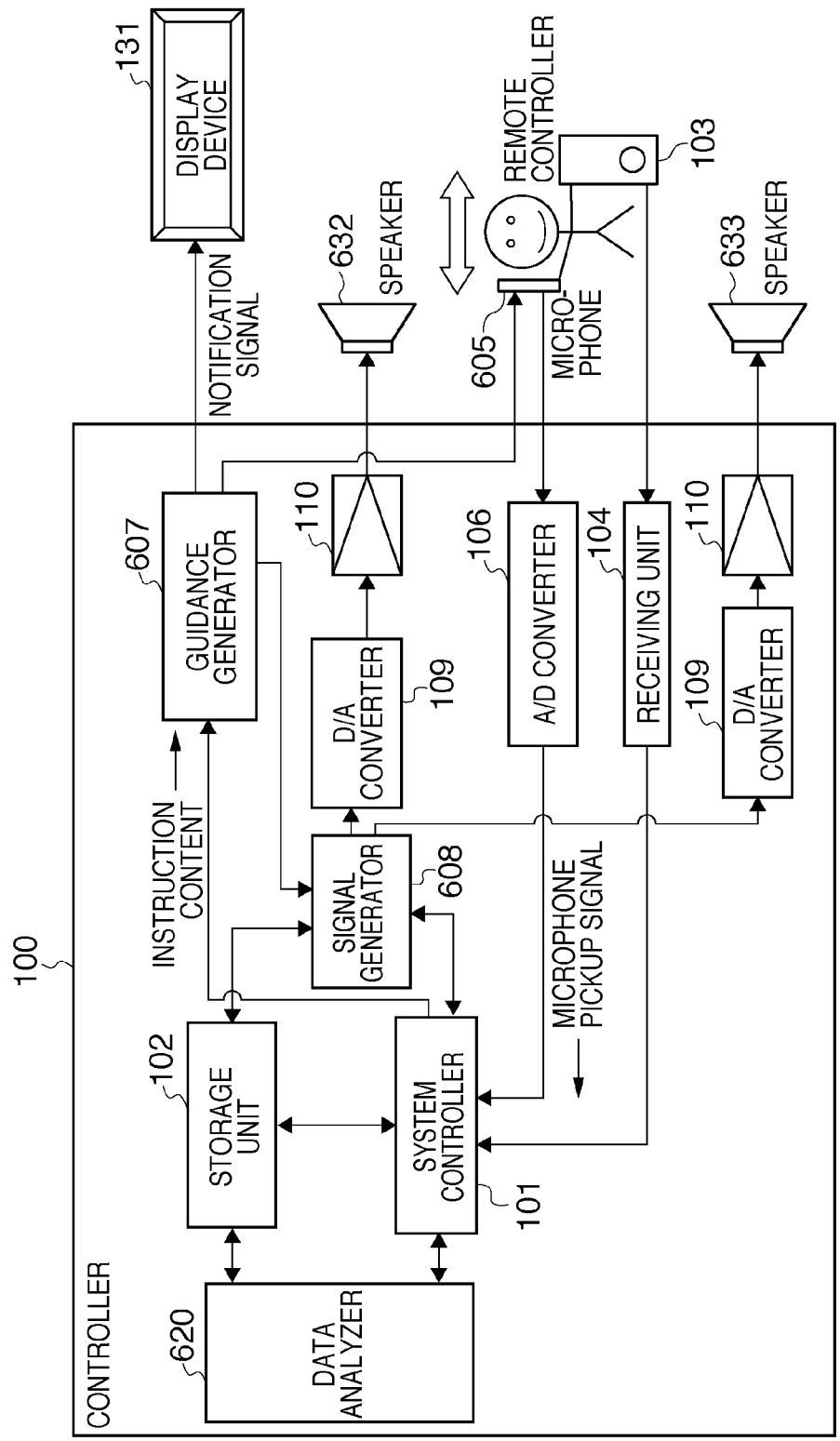
FIG. 16 is a block diagram of a standing wave detection apparatus according to the fifth embodiment.

FIG. 16 is a block diagram showing the functional arrangement of a standing wave detection apparatus according to the fifth embodiment. The major components are the same as in the first embodiment except that two speakers 632 and 633 are used as sound sources.

<Operation of Apparatus>

Processing up to root menu display for standing wave detection is the same as in the fourth embodiment. From the root menu, the user can input, via a remote controller 103, set values concerning the speakers 632 and 633 and a data analyzer 620 as input of various kinds of data. Examples of settings concerning the speakers 632 and 633 are input of the distance between the speakers and designation of the channel of the speaker to generate a measurement signal. In the following description, the speaker 632 generates the measurement signal. Settings concerning the data analyzer 620 are the same as in the fourth embodiment.

When the user selects a menu of detection start from the root menu of standing wave detection by operating the remote controller 103, guidance to prompt moving to the measurement start point is displayed. The user holds a microphone 605, moves to the measurement start point, for example, one of the four corners of the listening area, and stands by.

When ready, the user sends a command from the remote controller 103 to a controller 100 to notify it of the start of measurement. Triggered by this, a signal generator 608 generates a measurement signal and a distance measurement signal. These signals are directly recorded in a storage unit 102 as original signals. On the other hand, a sound of the measurement signal is generated from the speaker 632 via a D/A converter 109 and an amplifier 110, and a sound of the distance measurement signal is generated from the speaker 633 via the D/A converter 109 and the amplifier 110. Note that if the speakers 632 and 633 are active speakers incorporating an amplifier, the amplifier 110 in the controller 100 need not perform amplification. As the distance measurement signal, for example, a pulse train signal having a frequency f3 component which is not included in the target frequency range of standing wave detection, i.e., f1 to f2. The pulse interval is adjusted to the length of the time window of the data analyzer 620.

Simultaneously with the signal generation, recording of the time series data of a microphone pickup signal from the microphone 605 to the storage unit 102 via an A/D converter 106 and a system controller 101 starts. The user listens to the sounds of the signals from the speakers 632 and 633 and starts walking with the microphone 605 held in hand, thereby starting mobile measurement. At this time, the height of the microphone 605 held by the user is preferably the height of the user's ear (about 1 m) when he/she sits and listens to music in the room.

The detection accuracy of the extrema of standing waves to be detected is influenced by the moving speed of the microphone 605. Hence, the data analyzer 620 sequentially analyzes the microphone pickup signals recorded in the storage unit 102, and predicts the position of the extreme of a standing wave for each frequency. An instruction content is determined based on the prediction result and the current moving speed, and sent from the data analyzer 620 to a guidance generator 607 via the system controller 101. The guidance generator 607 generates a notification signal corresponding to a device serving as a notification means such as a display device 131 or the speaker 632 or 633 based on the instruction content received from the system controller 101. If the microphone 605 has a lighting unit, it also can make a notification. Hence, in the fifth embodiment, the microphone 605 is also handled as one of the notification devices. The instruction content sent from the system controller 101 is expected to be implemented by presenting the notification signal generated by the guidance generator 607 to the user via such a notification device.

<Data Analysis>

As described above, when the measurement along a path has started, the data analyzer 620 starts analyzing the continuous sound pressure data (microphone pickup signal) stored in the storage unit 102. A procedure of causing the data analyzer 620 to analyze the data stored in the storage unit 102 to detect standing waves will be described below in more detail.

Figure 17B:
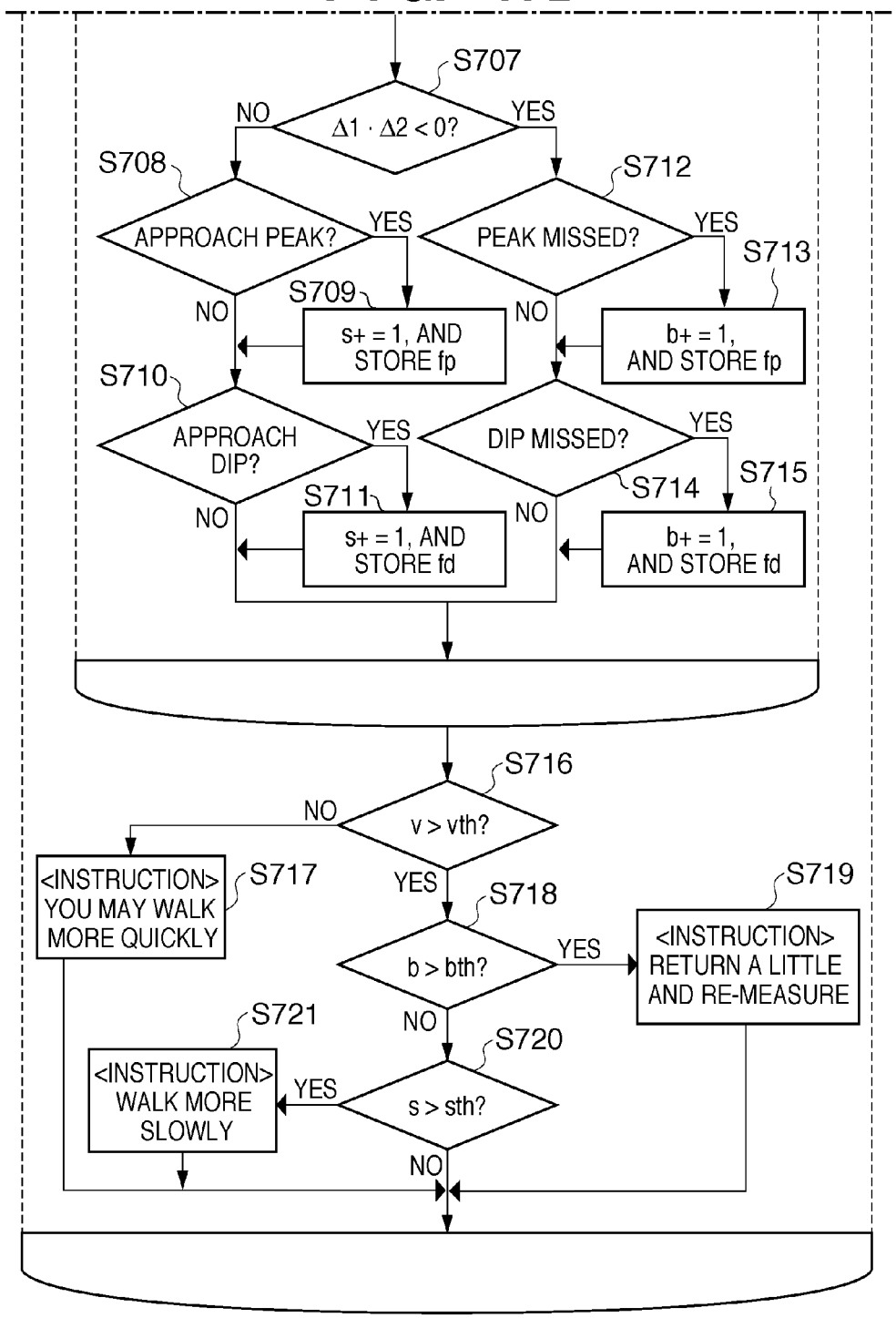

FIGS. 17A and 17B are flowcharts of data analysis by the data analyzer.

Signal extraction from the microphone pickup signal in step S701 is the same as in step S201 of FIG. 12A. Transfer function calculation in step S702 correspond to step S204.

In step S703, the coordinates of the microphone 605 are acquired. However, since the traversing device 140 of the fourth embodiment does not exist, the coordinates of the microphone 605 cannot be acquired directly. The coordinates are therefore calculated from the transfer function calculated in step S702 including the sound information from the speakers 632 and 633.

First, a propagation time t1 from the speaker 632 that is generating the sound of the measurement signal to the microphone 605 is obtained. More specifically, for example, after the frequency f3 component of the distance measurement signal is removed from the transfer function, inverse Fourier transform is performed. Then, the propagation time t1 is obtained from the peak time of the obtained response. Next, a propagation time t2 from the speaker 633 that is generating the sound of the distance measurement signal to the microphone 605 is obtained. More specifically, for example, after the frequency f3 component of the distance measurement signal is extracted from the transfer function, inverse Fourier transform is performed. Then, the propagation time t2 is obtained from the peak time of the obtained response. To more easily discriminate the peak time, the propagation time may be obtained by the squared value of the response.

The thus obtained propagation times t1 and t2 are multiplied by the sound velocity c, thereby obtaining a distance R from the speaker 632 to the microphone 605 and a distance r from the speaker 633 to the microphone 605. Therefore, the coordinates of the microphone 605 are obtained as the coordinates of an intersection of two circles having the two speakers 632 and 633 as their centers.

Figure 18:
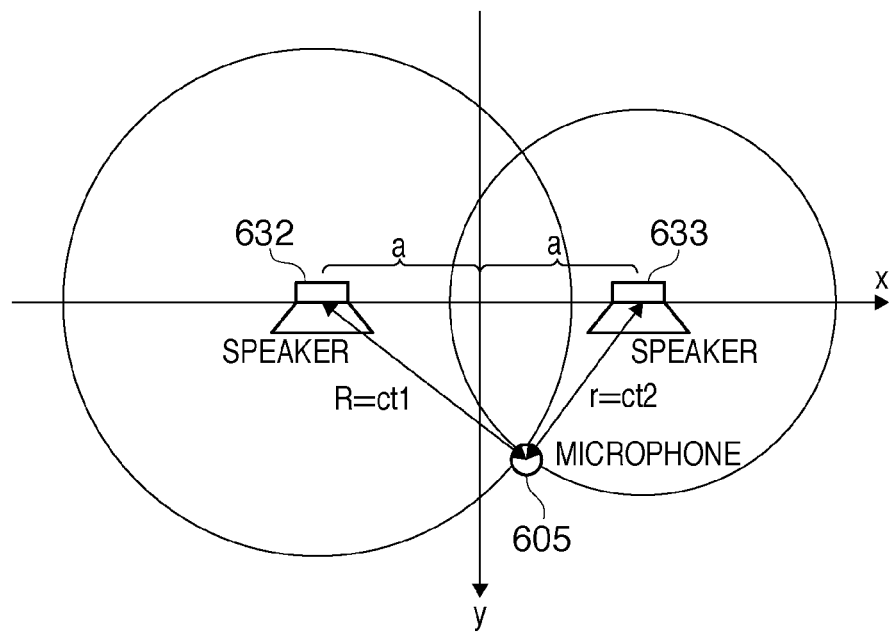
FIG. 18 is a view for explaining the principle of microphone coordinate calculation according to the fifth embodiment.
Figure 19:
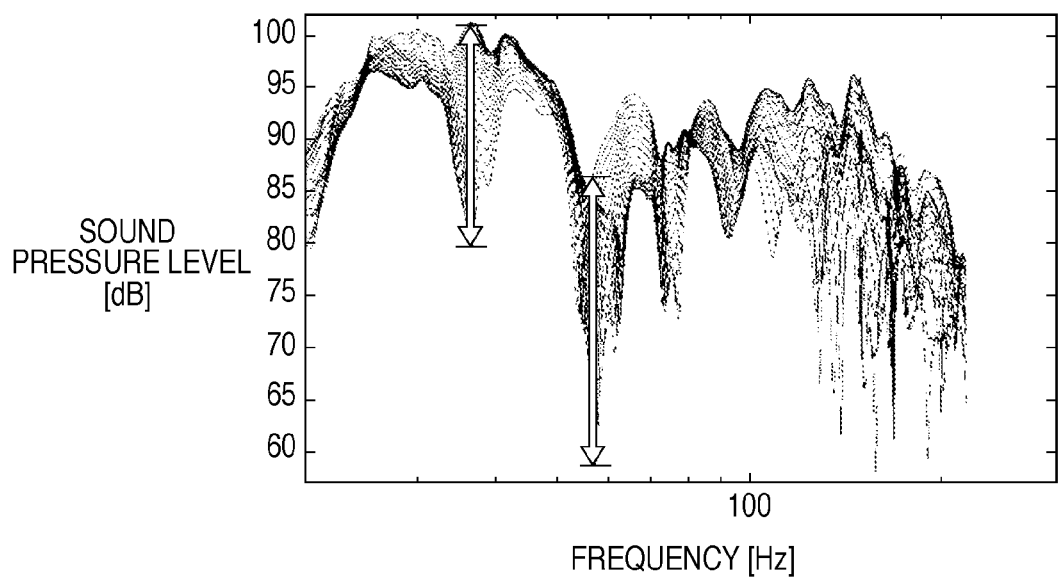
FIG. 19 is a graph showing an example of a result of fixed-point measurement.

FIG. 18 is a view illustrating the positional relationship between the two speakers and the microphone. Letting 2a be the distance between the two speakers 632 and 633, a speaker coordinate system as shown in FIG. 18 is set. Then, the coordinates of the microphone 605 are obtained as the coordinates of an intersection of two circles given by $$(x+a)^2+y^2=R^2$$

$$(x-a)^2+y^2=r^2 \quad (12)$$

Simultaneous equations (12) are solved to obtain the coordinates $(x_m, y_m)$ of the microphone 605, which are given by $$x_m=(R^2-r^2)/4a$$

$$y_m=\sqrt{\{R^2-(x_m+a)^2\}} \quad (13)$$

The distance 2a between the speakers can be either input by the user as input of various kinds of data or acquired by measurement from a menu provided to detect the distance between the speakers. More specifically, measurement is done while traversing a line that connects the speakers 632 and 633. A minimum sum of the propagation times is multiplied by the sound velocity c so that the distance is obtained by c·(t1+t2).

In step S704, the moving speed of the microphone 605 is calculated based on the process cycle interval and the difference between the coordinates obtained in step S703 and those in the immediately preceding process cycle.

The loop from step S705 to step S715 is the same as that from step S205 to step S215 of the fourth embodiment, and a description thereof will not be repeated.

In step S716, an allowable speed vth determined by the determination result concerning an extreme point in the loop is compared with an actual moving speed v calculated in step S704. If $v \leq vth$, it is determined that no problem is posed in terms of extreme point detection. However, the measurement time is determined to be wasted, and the process advances to step S717. On the other hand, if the moving speed v exceeds the allowable speed vth in step S716, the process advances to step S718 to execute processing to cope with it.

In step S717, to shorten the measurement time, an instruction content "you may walk more quickly" is determined, and the processing in the current process cycle ends. An instruction to increase the moving speed to vth is ideal. However, since the instruction target is not a machine control system such as the traversing device 140 but the user, the instruction content is fuzzy.

In step S718, the number b of frequency components determined to have missed extreme points is compared with a predetermined threshold bth, as in step S218. If the number exceeds the threshold, the process advances to step S719 to cope with it. If the determination condition of step S718 is false, the process advances to step S720.

In step S719, since the moving speed exceeds the allowable speed vth, it is determined that an extreme point has been missed. A fuzzy instruction content "return a little and re-measure" is determined, and the processing in the current process cycle ends.

In step S720, the number s of frequency components determined to approach extreme points is compared with a predetermined threshold sth, as in step S220. If the number exceeds the threshold, the process advances to step S721 to cope with it. If the determination condition of step S720 is also false, the processing in the current process cycle ends without updating the instruction content in the preceding process cycle.

In step S721, to guarantee the extreme point detection accuracy, a fuzzy instruction content "walk more slowly" is determined, and the processing in the current process cycle ends.

The instruction content thus determined by the data analyzer 620 is sent to the guidance generator 607 via the system controller 101. Based on the received instruction content, the guidance generator 607 generates a notification signal corresponding to the notification device such as the display device 131, the microphone 605 with a lightning unit, or the speaker 632 or 633.

When the display device 131 is used as the notification device, the instruction content may directly be displayed as a text, or a graphical orientation such as an arrow may be associated with each instruction content. For example, an up arrow indicates "you may walk more quickly"; a lateral arrow, "walk more slowly"; and a down arrow, "return a little and re-measure".

When the microphone 605 with a lightning unit is used as the notification device, a lighting color can be associated with each instruction content. For example, by association with a signal, blue indicates "you may walk more quickly"; yellow, "walk more slowly"; and red, "return a little and re-measure". Since the microphone 605 is in the user's hand, an effective notification is supposed to be done.

When the speaker 632 or 633 is used as the notification device, a sound pitch, length, or intermittent tone interval can be associated with each instruction content. For example, "return a little and re-measure" is indicated by a sound that reminds the user of the sound of a car rolling backward. In this case, the frequency band of the notification signal must not overlap that of the measurement signal or distance measurement signal.

When not only the fuzzy instruction content but also quantitative information such as the actual moving speed v and allowable speed vth are sent to the guidance generator 607, a notification corresponding to the values of these pieces of information can also be done. For example, when the display device 131 is used as the notification device, the size of characters or graphic representing the instruction content may be changed in accordance with the difference between vth and v. Alternatively, a scale by velocity may be displayed, and the positions of the allowable speed vth and the user's moving speed v may be indicated in real time. This allows the user to easily adjust the moving speed. When a visual notification signal is used for, e.g., the display device 131 or the microphone 605 with a lighting unit, the brightness, color, or blinking interval of the signal may be changed continuously in accordance with the difference between vth and v. Similarly, when an auditory notification signal is used for, e.g., the speaker 632 or 633, the amplitude of the signal (sound volume) may be changed continuously in accordance with the difference between vth and v.

In this way, the instruction content sent from the system controller 101 is expected to be implemented by presenting the notification signal generated by the guidance generator 607 to the user via such a notification device.

While repeating the above-described operation, the user searches the listening area like sweeping. The sound data obtained by predicting extreme points and coping with them is recorded in the storage unit 102 for each process cycle together with the coordinates, moving speed, and allowable speed of the microphone 605 and the channel of the speaker that has generated the sound of the measurement signal. When re-measurement is performed, the data are overwritten and updated. When the search of the listening area has ended, the user sends a command to notify the end of measurement from the remote controller 103 to the controller 100. Triggered by this, sound generation from the speakers 632 and 633 stops, and the mobile measurement ends.

As described above, the standing wave detection apparatus according to the fifth embodiment can predict the extreme points of standing waves generated in a room during mobile measurement. When moving speed guidance is sequentially done, based on the prediction result of an extreme point, for the user who is moving with the microphone, measurement time shortening and accurate extreme point detection can be implemented simultaneously.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-133452, filed Jun. 2, 2009, which is hereby incorporated by reference herein in its entirety.

What is claimed is:

1. A standing-wave detection apparatus for detecting a standing wave in a predetermined space, comprising:
a sound-receiving unit adapted to receive a sound generated from a sound source arranged in the predetermined space;
a storage unit adapted to store time series sound pressure level data acquired by said sound-receiving unit during movement along a path in the predetermined space;
a level adjustment unit adapted to derive an adjustment curve determined based on a lower envelope of the time series sound pressure level data stored in said storage unit, and to adjust the time series sound pressure level data stored in said storage unit by subtracting, from a sound pressure level value at each point of time of the time series sound pressure level data, a value at a corresponding point of time on the adjustment curve; and
a detection unit adapted to detect an existence position of a standing wave in the predetermined space based on the adjusted time series sound pressure level data,
wherein each of the level adjustment unit and the detection unit is implemented by using one or more processors.

2. The apparatus according to claim 1, wherein said detection unit detects a local minimum contained in the adjusted time series sound pressure level data, and detects a point of time corresponding to the local minimum as an existence position of a node of the standing wave in the predetermined space.

3. The apparatus according to claim 1, wherein said detection unit detects a local maximum contained in the adjusted time series sound pressure level data, and detects a point of time corresponding to the local maximum as an existence position of an anti-node of the standing wave in the predetermined space.

4. The apparatus according to claim 1, further comprising a display unit adapted to output, as an image, the existence position of the standing wave detected in the predetermined space by said detection unit.

5. The apparatus according to claim 1, wherein
at least said sound-receiving unit is configured to be removable from the standing-wave detection apparatus so as to be movable in the predetermined space, and
the standing-wave detection apparatus further comprises an audio instruction unit adapted to output an audio instruction, having a frequency band different than a frequency band of the sound acquired by said sound-receiving unit, to a user who moves with said sound-receiving unit.

6. The apparatus according to claim 5, wherein
said adjustment unit comprises a determination unit adapted to determine whether the adjustment curve determined using the lower envelope of the time series sound pressure level data stored in said storage unit exceeds a threshold, and if said determination unit has determined that the adjustment curve exceeds the threshold, said audio instruction unit outputs an audio instruction for re-measurement.

7. The apparatus according to claim 1, wherein at least said sound-receiving unit is configured to be removable from the standing-wave detection apparatus so as to be movable in the predetermined space, and the standing-wave detection apparatus further comprises:

a driving unit adapted to moving said sound-receiving unit in the predetermined space; and a remote control unit adapted to remote-control said driving unit.

8. The apparatus according to claim 7, further comprising:

a position detection unit adapted to detect a position of said sound-receiving unit in the predetermined space; and a prediction unit adapted to predict the existence position of one of the node and the anti-node of the standing wave based on a change in sound pressure level input by said sound-receiving unit during the movement along the path in the predetermined space, wherein said remote control unit controls said driving unit so as to change a moving speed of said sound-receiving unit based on the position detected by said position detection unit and the predicted existence position of one of the node and the anti-node of the standing wave.

9. A method of controlling a standing-wave detection apparatus for detecting a standing wave in a predetermined space, comprising the steps of:

receiving, from a sound-receiving unit, a sound generated from a sound source arranged in the predetermined space;

storing, in a storage unit, time series sound pressure level data acquired in the step of receiving the sound during movement along a path in the predetermined space;

deriving an adjustment curve determined based on a lower envelope of the time series sound pressure level data stored in the storage unit;

adjusting the time series sound pressure level data stored in the storage unit by subtracting, from a sound pressure level value at each point of time of the time series sound pressure level data, a value at a corresponding point of time on the adjustment curve; and detecting an existence position of a standing wave in the predetermined space based on the adjusted time series sound pressure level data.

\* \* \* \* \*